United States Patent
Kumar et al.

(10) Patent No.: US 10,013,864 B1
(45) Date of Patent: Jul. 3, 2018

(54) ALERTS AND REMINDERS IN A PERSONAL AREA NETWORK

(71) Applicant: QUALCOMM Incorporated, San Diego, CA (US)

(72) Inventors: Akash Kumar, Hyderabad (IN); Ankita, Hyderabad (IN); Ashutosh Giri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/627,053

(22) Filed: Jun. 19, 2017

(51) Int. Cl.
*H04M 3/42* (2006.01)
*G08B 21/18* (2006.01)
*H04W 12/06* (2009.01)
*H04L 29/06* (2006.01)
*G06Q 10/02* (2012.01)

(52) U.S. Cl.
CPC ............ *G08B 21/18* (2013.01); *G06Q 10/02* (2013.01); *H04L 63/08* (2013.01); *H04W 12/06* (2013.01)

(58) Field of Classification Search
CPC . H04W 84/12; H04W 48/16; H04M 2250/02; H04M 1/7253; H04M 1/6066; H04M 1/72516; H04N 2201/0036; H04N 2201/0017; H04N 2201/0075; H04N 2201/0096; H04B 5/00; H04B 17/27; G06Q 10/109; G06F 1/329; G08B 21/24; H04Q 2209/43; H04Q 2209/47; H04Q 2209/826; H04Q 9/00
See application file for complete search history.

(56) References Cited

U.S. PATENT DOCUMENTS

| | | | |
|---|---|---|---|
| 7,109,848 B2 | 9/2006 | Schybergson | |
| 9,286,783 B1 | 3/2016 | Teller et al. | |
| 2003/0166409 A1* | 9/2003 | Ishii | H04M 1/6058 455/569.1 |
| 2010/0019920 A1* | 1/2010 | Ketari | G08B 13/1427 340/686.6 |
| 2010/0130260 A1* | 5/2010 | Naruse | H04M 1/0256 455/566 |
| 2011/0050447 A1* | 3/2011 | Tedesco | G08B 13/1427 340/687 |
| 2014/0077944 A1 | 3/2014 | Baskin et al. | |
| 2014/0196051 A1 | 7/2014 | Subramanya et al. | |
| 2015/0172237 A1 | 6/2015 | Krishna et al. | |

* cited by examiner

*Primary Examiner* — Quan M Hua
(74) *Attorney, Agent, or Firm* — Arent Fox, LLP and Qualcomm, Incorporated

(57) ABSTRACT

With the Internet of Things, many devices and/or objects may be connected to each other using any number of wired or wireless technologies. A user may forget a that may be relevant to an upcoming event. The user may benefit from a mechanism that notifies the user when an event is upcoming in which a specific device or object may be germane but is not proximate to the user. Accordingly, an apparatus may identify a set of device types associated with an upcoming event. The apparatus may determine a device type of the set of device types is disconnected from the apparatus. The apparatus may select a device from a set of devices associated with the at least one device type based on a subset of a set of parameters. The apparatus may provide an indication of the selected device associated with the at least one device type.

30 Claims, 10 Drawing Sheets

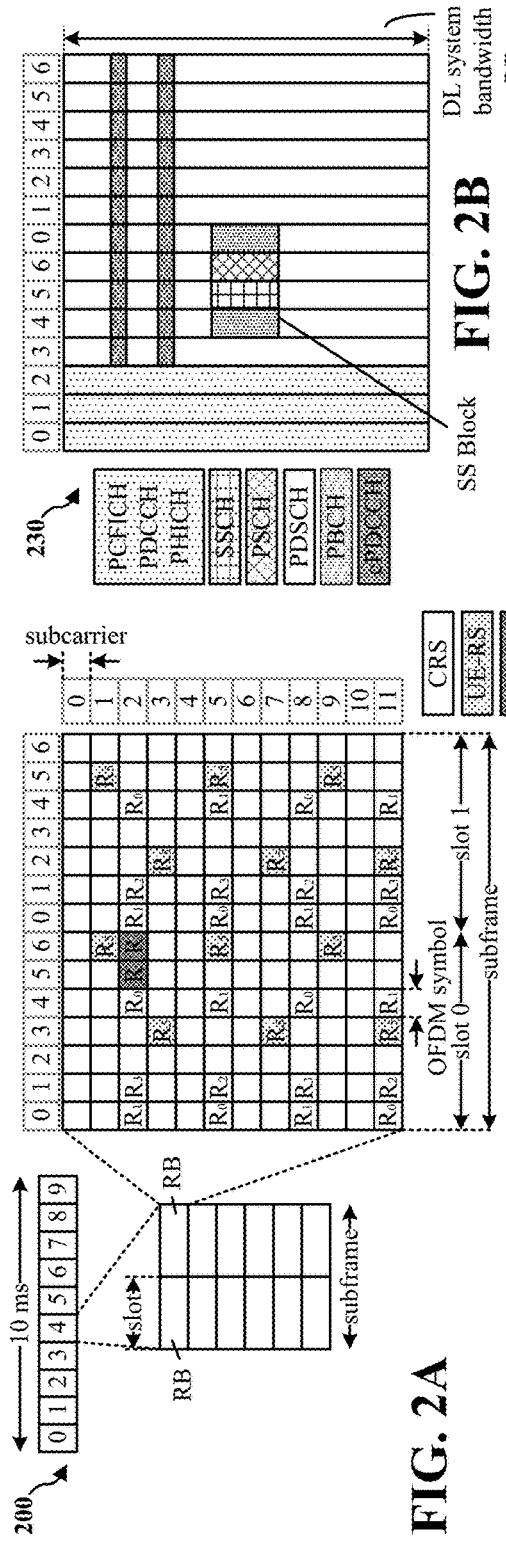
FIG. 2A
FIG. 2B
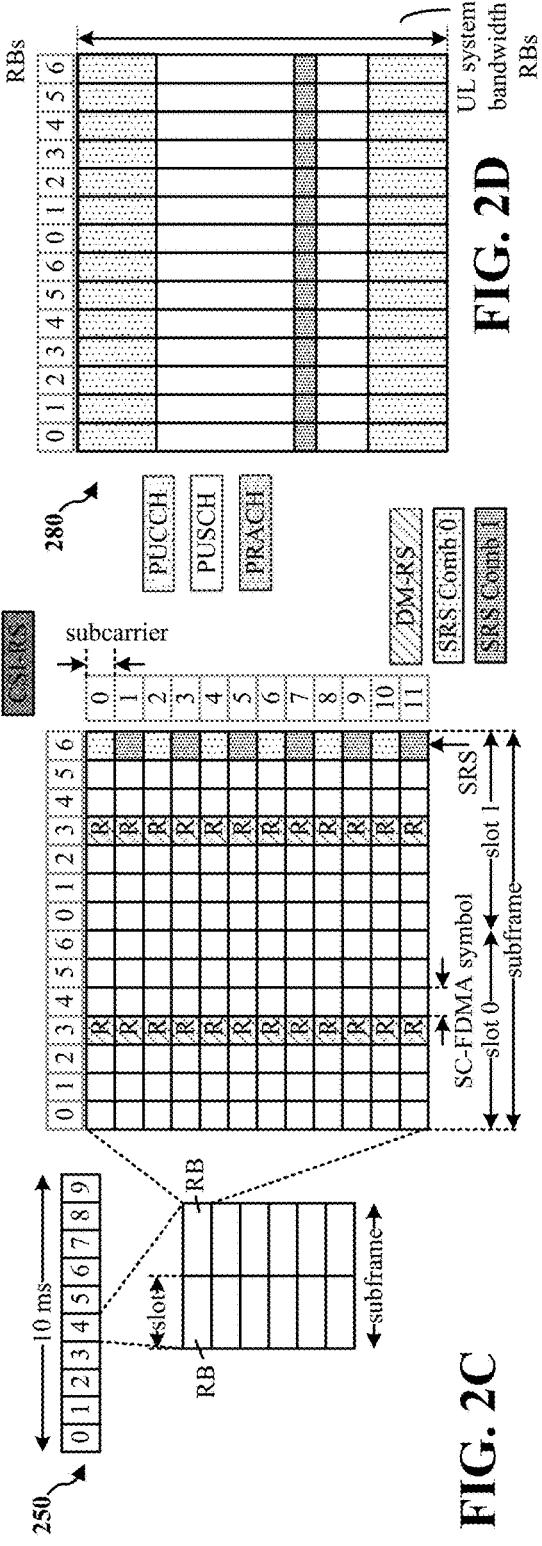
FIG. 2C
FIG. 2D

ALERTS AND REMINDERS IN A PERSONAL AREA NETWORK

BACKGROUND

Field

The present disclosure relates generally to communication systems, and more particularly, to a communications device configured to provide an indication that another device is disconnected from the communications device.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Smart devices are ubiquitous in the current market. Often, users possess multiple devices that may be associated with one another. For example, a wireless communications device may be associated with wireless headphones and/or an activity monitor. Additionally, many devices or objects (e.g., keys, credit cards, etc.) are equipped with radio-frequency identification (RFID) or another personal area network (PAN) technology for association with a wireless communications device. Such devices or objects may be specific to various activities, but may be forgotten by a user when the user is to engage in such activities. Accordingly, a user may benefit from a system that provides the user with an indication of a device or object that the user may have otherwise forgotten when the user is to engage in such activities.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a contemporary context, many individuals possess a plurality of "smart" devices. Such "smart" devices may include devices configured for the Internet of things (IoT). The IoT may include communication of physical devices that may be embedded with various components (e.g., sensors, chips, circuits, electronic tags, etc.), for example, in order to collect and communicate data. Examples of "smart" devices include smart phones, personal data assistants (PDAs), smart watches, activity monitors, health bands, pagers, cameras, and many other devices. Further, other physical objects, such as keys, credit cards, and the like may be equipped with radio-frequency identification (RFID) tags and/or personal area network (PAN) technology that allow inter-device connectivity for an IoT experience.

With the IoT, many devices and/or objects may be connected to each other using any number of wired or wireless technologies. For example, many devices may be connectable using Wi-Fi, Wi-Fi direct, Bluetooth, LTE-Direct, or another technology. A user may have several devices and/or objects that may be specific to a particular context and so a user may not need to carry all his or her devices in every context. However, a user may forget one or more devices that may be relevant to a context. Therefore, a user may benefit from an intelligent mechanism that notifies the user when the user is approaching a specific context in which a specific device or object may be germane but is not proximate to the user.

In an aspect of the disclosure, a method, a computer-readable medium, and an apparatus are provided. The apparatus may identify a set of device types associated with an upcoming event. The apparatus may determine that at least one device type of the set of device types is disconnected from the apparatus. The apparatus may select a device from a set of devices associated with the at least one device type based on a subset of a set of parameters. The apparatus may provide an indication of the selected device associated with the at least one device type, and the indication may indicate that the at least one selected device is disconnected from apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
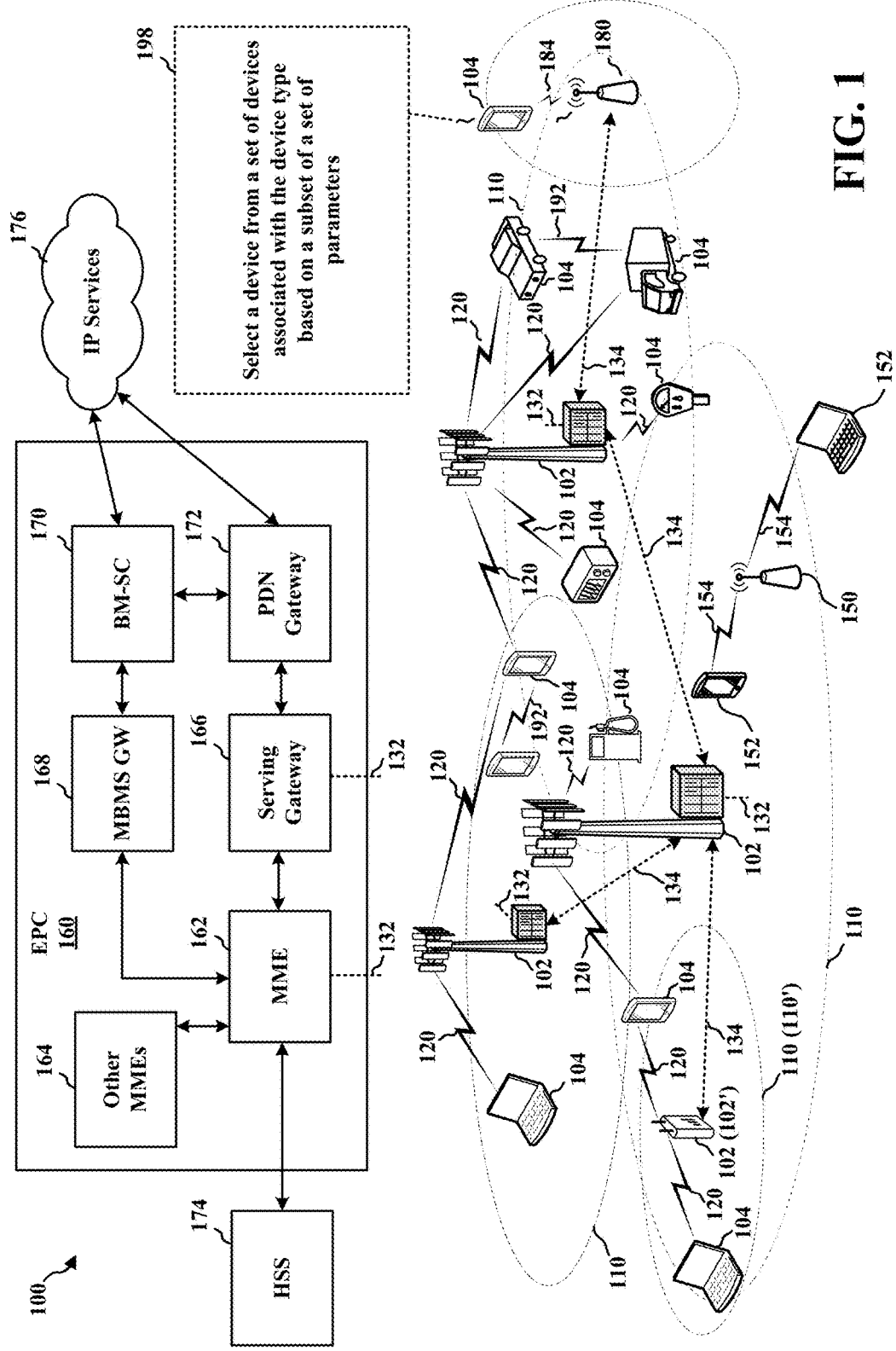
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as Internet of things (IoT) devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to communicate with one or more other devices, such as IoT devices. As used herein, an IoT device may refer to any device configured for wireless communication—that is, any device with circuitry configured to transmit and/or receive signals. Examples of IoT devices include UEs, personal data assistants (PDAs), tablets, computers (e.g., laptop or desktop computers), or other conventional processing systems configured for wireless communication. Further examples of IoT devices include devices configured with personal area network (PAN) circuitry, such as wireless headphones, activity monitors, health bands, smart watches, and so forth. Further examples of IoT devices include devices configured with radio-frequency identification (RFID) circuitry, such as keys, credit cards, and so forth. Further examples of IoT devices include devices configured with sensors, such as heart rate monitors and the like, which may be configured to wirelessly transmit sensor data.

In various aspects, the UE 104 may be configured to identify a set of device types associated with an upcoming event. The UE 104 may be configured to determine that at least one device type of the set of device types is disconnected from the UE 104. The UE 104 may be configured to select 198 a device from a set of devices associated with the at least one device type based on a subset of a set of parameters. The UE 104 may be configured to provide an indication of the selected device associated with the at least one device type, for example, in order to indicate that the at least one selected device is disconnected from the wireless device.

By way of example, the upcoming event may be an athletic training session, such as when a user exercises at a gym. The UE 104 may identify a set of device types associated with the athletic training session—e.g., the UE 104 may identify a device type of wireless headphones that is associated with the athletic training session and/or the UE 104 may identify a device type of activity monitor that is associated with the athletic training session. The UE 104 may determine that the device type of wireless headphones is disconnected from the UE 104 (e.g., the UE 104 does not have a Bluetooth connection established with any wireless headphones). Based on the determination that the device type of wireless headphones is disconnected from the UE 104, the UE 104 may select a device from a set of devices associated with the at least one device type based on a subset of a set of parameters. For example, the UE 104 may access stored data indicating respective battery levels or conditions determined when a first pair of wireless headphones were most recently connected to the UE 104 and a second pair of wireless headphones were most recently connected to the UE 104. The UE 104 select the first pair of wireless headphones instead of the second pair of wireless headphones when the stored data indicates that the most-recent battery level of the first pair of wireless headphones exceeds the most-recent battery level of the second pair of wireless headphones. The UE 104 may provide an indication of the selected first pair of wireless headphones, and the indication may indicate that the device type of wireless headphones currently disconnected from the UE 104. The UE 104 may provide the indication as a visual indication (e.g., an indication presented on a display of the UE 104), an audio indication (e.g., an indication played through speakers of the UE 104), and/or a tactile indication (e.g., a vibration caused by vibration motor of the UE 104).

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
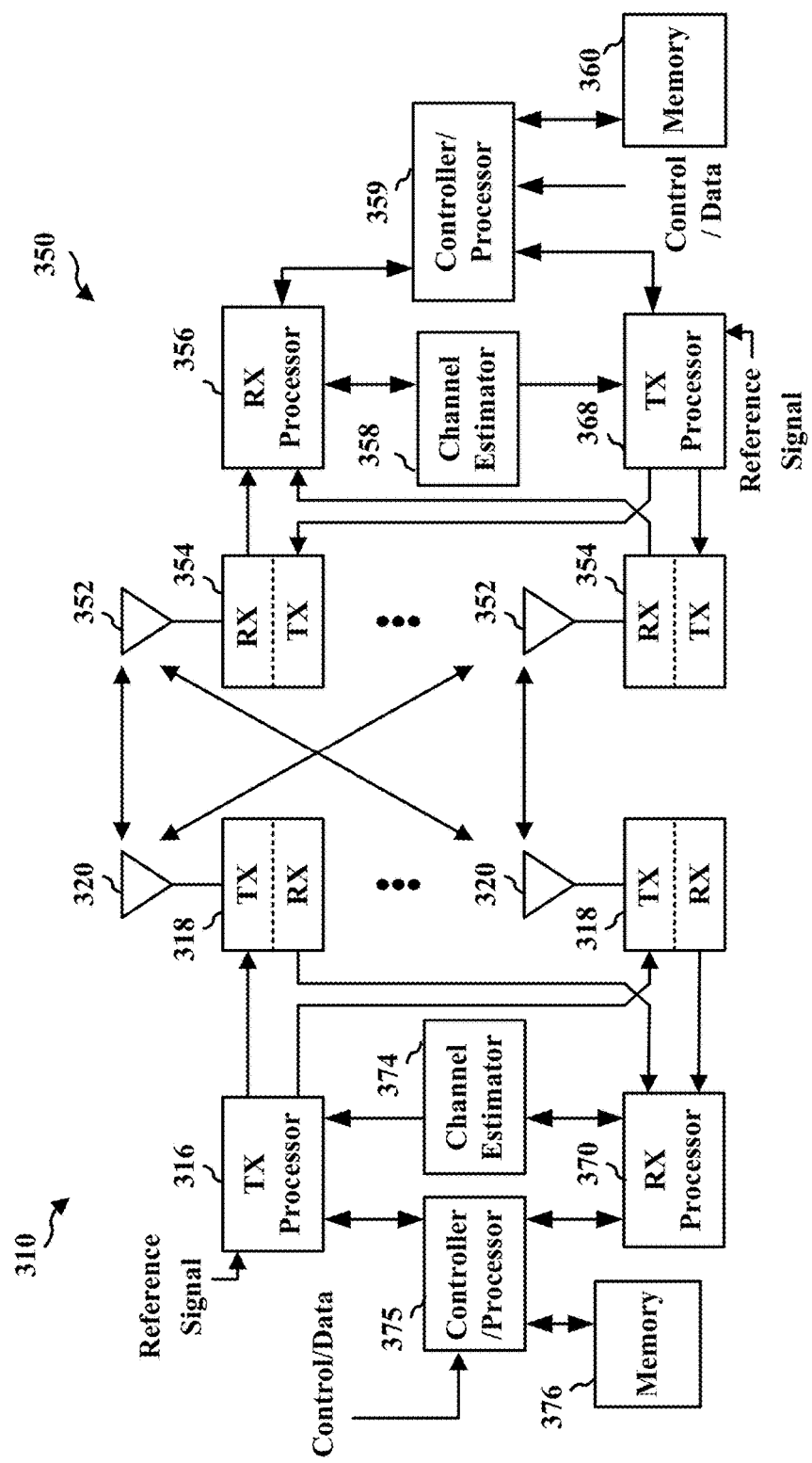
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In various aspects, a user may possess a plurality of "smart" devices, which may be configured for IoT communication. IoT devices may be embedded with circuitry (e.g., sensors, chips, circuits, electronic tags, readers, etc.), for example, in order to collect and communicate data. Examples of "smart" devices include smart phones, PDAs, tablets, personal computers, smart watches, activity monitors, health bands, pagers, cameras, and many other devices equipped with PAN circuitry and/or RFID circuitry.

With the IoT communication, many devices may be connected to each other using any number of wired or wireless technologies. For example, many devices may be connectable using Wi-Fi, Wi-Fi direct, Bluetooth, LTE-Direct, RFID, or another technology. A user may have several devices that may be relevant to a particular context and so the user may not need to carry all his or her devices in every context. However, the user may benefit from an intelligent mechanism that notifies the user when the user is approaching a specific context in which a specific device may be germane but is not proximate to the user.

Figure 4:
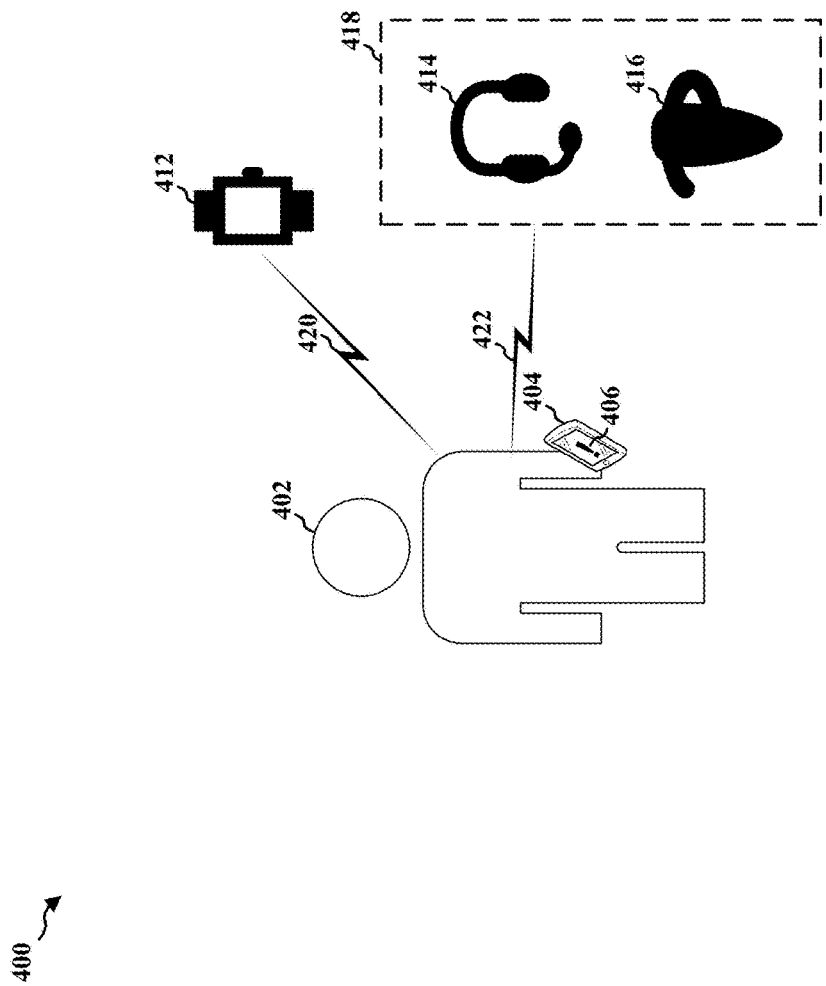
FIG. 4 is a diagram illustrating a wireless communications environment.

FIG. 4 is a diagram of a wireless communications environment 400. In the wireless communications environment 400, a user 402 may possess a wireless device 404. By way of example, the wireless device 404 may be a UE, a smart phone, a tablet computer, a personal computer, or another processing system configured for wireless communication. The wireless device 404 may be configured with PAN circuitry, such as a Bluetooth module, FlashLinQ module, WiMedia module, ZigBee module, Wi-Fi module (e.g., for Wi-Fi Direct), etc. In one aspect, the wireless device 404 may be configured with circuitry for reading and/or detecting electronic tags, such as RFID tags.

In various aspects, the wireless device 404 may be associated with a plurality of devices 412, 414, 416. For example, the wireless device 404 may be associated with a smart watch 412 via a Wi-Fi Direct connection 420. In another example, the wireless device 404 may be associated with a first headset 414 and a second headset 416 via a Bluetooth connection 422 (e.g., the wireless device 404 may be paired with the first headset 414 and the second headset 416).

The wireless device 404 may be configured with calendar functionality, for example, in order to store information indicating a schedule and/or activity related to the user 402. For example, a calendar of the wireless device 404 may store information indicating events for which the user 402 is scheduled. In one aspect, the wireless device 404 may add events to the calendar based on manual input from the user 402 (e.g., through an input component, such as a touch screen or keyboard). In another aspect, the wireless device 404 may add events to the calendar based on received data, such as an email message indicating an appointment and/or a meeting request.

In another aspect, the wireless device 404 may add events to the calendar based on collected data. For example, the wireless device 404 may collect data indicating a location of the user 402 (e.g., based on GPS or WiFi signature(s)) at a specific time across a plurality of dates. The wireless device 404 may add events to the calendar by collecting historical data and observing trends. For example, the user 402 may frequent the gym at 5:00 PM Monday through Friday, and the wireless device 404 may observe the trend of frequenting the gym by detecting a WiFi signature of the gym at 5:00 PM across a plurality of dates. Accordingly, the wireless device 404 may add the gym to the calendar at 5:00 PM on dates of Monday through Friday.

The wireless device 404 may be configured to store information indicating device types that may be relevant (e.g., used) for an event in the calendar. In one aspect, a device type may be associated with a set of devices corresponding to the device type. For example, the device type 418 may be a headset type. The device type 418 may include a first headset 414 and a second headset 416. In aspects, the device type 418 may be associated with an event in the calendar that includes the gym, so that a headset type is associated with the events that include the gym.

In one aspect, the wireless device 404 may be configured to receive manual input from the user 402 that indicates one or more device types associated with an event. For example, the wireless device 404 may receive, from the user 402, input indicating that the device type 418 is relevant to an event.

In another aspect, the wireless device 404 may be configured to observe trends that indicate a certain device type is connected to the wireless device 404 during certain events. For example, the wireless device 404 may detect that a device type 418 is frequently connected to the wireless device 404 when the wireless device 404 detects the location as the gym. Accordingly, the wireless device 404 may associate the device type 418 with events that include the gym (e.g., the gym may be a location detected by GPS and/or WiFi signature).

In one aspect, a device type may be associated with a priority for an event. For example, the device type 418 may be associated with a high priority (e.g., "mandatory") for certain events, such as telephone meetings or the gym. The wireless device 404 may use the priority associated with a device type in order to determine when/if the wireless device 404 should provide an indication 406 to the user and/or to provide an indication 406 of one device type having a higher priority instead of another device type having a lower priority.

In an aspect, the wireless device 404 may determine that an event is upcoming. In one aspect, the wireless device 404 may select an upcoming event based on a current date and/or time and a first event in the calendar that is scheduled to occur after the current date and/or time. For example, the wireless device 404 may determine the current date and/or time and identify an event in the calendar. The wireless device 404 may determine that the event in the calendar is an upcoming event when the current date and/or time is within a threshold time of the date and/or time of the event in the calendar. For example, the wireless device 404 may determine that the gym is an upcoming event when an event including the gym occurs in the calendar within five minutes of the current date and time.

The wireless device 404 may be configured to identify a set of device types associated with an event. In one aspect, the wireless device 404 may determine the set of device types associated with an upcoming event based on a list of device types. For example, the wireless device 404 may identify a set of device types that includes the device type 418 associated with an upcoming event that includes the gym.

In one aspect, the wireless device 404 may determine that the upcoming event includes a time period during which at least one device type has been connected to the wireless device 404. Accordingly, the wireless device 404 may identify the set of device types associated with the upcoming event based on a past time period during which the set of devices types was connected to the wireless device 404. For example, the wireless device 404 may determine the time period of 5:00 PM to 6:00 PM during which the device type 418 has been connected to the wireless device 404. Thus, when the upcoming event has a time period of 5:00 PM to 6:00 PM, the wireless device 404 may identify the device type 418 as associated with the upcoming event.

When the wireless device 404 determines that an event is an upcoming event and the wireless device 404 identifies the set of device types associated with the upcoming event, the wireless device 404 may determine that at least one device type of the set of device types is disconnected from the wireless device 404. For example, the wireless device 404 may determine that the gym is an upcoming event, and the wireless device 404 may identify the device type 418 associated with the upcoming event including the gym. The wireless device 404 may determine that the device type 418 is disconnected from the wireless device 404. For example, the wireless device 404 may determine that neither the first headset 414 nor the second headset 416 are connected to the wireless device 404 when the upcoming event includes the gym and the set of device types includes the device type headphones.

The wireless device 404 may determine that a device is connected to the wireless device by detecting an established connection between the wireless device 404 and the device. For example, the wireless device 404 may detect an established Bluetooth connection. In another example, the wireless device 404 may detect an RFID tag through an RFID reader of the wireless device 404 in order to detect a connection. The wireless device 404 may then map the device detected to be connected to the wireless device 404 to a device type corresponding to the device (e.g., based on a mapping table).

In aspects, the wireless device 404 may select a device from a set of devices associated with the at least one device type based on a subset of a set of parameters. In one aspect, the wireless device 404 may select a device from a set of devices associated with the at least one device type based on the determination that the at least one selected device is disconnected from the wireless device 404. The set of parameters may include a battery level or condition (e.g., available power) of a device, a data balance associated with a device, a voice balance associated with a device, an expected network coverage associated with a device at a location of the upcoming event, an expected call quality associated with a device at a location of the upcoming event, an expected data rate associated with a device at a location of the upcoming event, protocol compatibility between the wireless device 404 and a device (e.g., the smart watch 412), types of ports and/or availability of ports of the wireless device 404 (e.g., whether the wireless device 404 includes an available port suitable for a connection to a device, such as the smart watch 412), operating system (OS) or other application compatibility (e.g., whether the wireless device 404 includes an OS or other application that is compatible with an OS of the smart watch 412), whether the device is in use or reserved, or another parameter.

In an aspect, the wireless device 404 may determine one or more parameters associated with a device. For example, the wireless device 404 may determine a battery level or condition of the first headset 414 based on the observed battery level or condition when the first headset 414 was most recently connected to the wireless device 404.

In another example, the wireless device 404 may determine a data balance associated with the smart watch 412. A data balance may indicate the amount of data (e.g., in megabytes or gigabytes) that the smart watch 412 may communicate pursuant to a subscription associated with the smart watch 412. In an aspect, the wireless device 404 may determine a data balance when the smart watch 412 was most recently connected to the wireless device 404. In another aspect, the wireless device 404 may determine a data balance by querying an account associated with the smart watch 412.

In another example, the wireless device 404 may determine a voice balance associated with the smart watch 412. A voice balance may indicate the amount of voice (e.g., in minutes) that the smart watch 412 may communicate pursuant to a subscription associated with the smart watch 412.

In an aspect, the wireless device 404 may determine a voice balance when the smart watch 412 was most recently connected to the wireless device 404. In another aspect, the wireless device 404 may determine a voice balance by querying an account associated with the smart watch 412.

In another example, the wireless device 404 may determine an expected network coverage associated with the smart watch 412 at a location associated with the upcoming event. Network coverage may indicate whether the smart watch 412 may communicate with a network (e.g., a cellular network) at a location. In one aspect, the wireless device 404 may determine an expected network coverage associated with the smart watch 412 at a location associated with the upcoming event by querying a server or cloud-based system. In another aspect, the wireless device 404 may determine the expected network coverage associated with the smart watch 412 at a location associated with the upcoming event by observing the network coverage associated with the smart watch 412 when the smart watch 412 was most recently at the location associated with the upcoming event. For example, the wireless device 404 may observe the network coverage associated with the smart watch 412 when the smart watch 412 was at a location associated with the gym. Accordingly, the wireless device 404 may determine the expected network coverage associated with the smart watch 412 when the upcoming event includes the gym by determining the network coverage associated with the smart watch 412 when the smart watch 412 was most recently located at the gym.

In another example, the wireless device 404 may determine an expected call quality associated with the smart watch 412 at a location associated with the upcoming event. Call quality may indicate whether the smart watch 412 is able to maintain an on-going call without interruption (e.g., due to radio link failure) at a location. In one aspect, the wireless device 404 may determine an expected call quality associated with the smart watch 412 at a location associated with the upcoming event by querying a server or cloud-based system. In another aspect, the wireless device 404 may determine the expected call quality associated with the smart watch 412 at a location associated with the upcoming event by observing the call quality associated with the smart watch 412 when the smart watch 412 was most recently at the location associated with the upcoming event. For example, the wireless device 404 may observe the call quality associated with the smart watch 412 when the smart watch 412 was at a location associated with the gym. Accordingly, the wireless device 404 may determine the expected call quality associated with the smart watch 412 when the upcoming event includes the gym by determining the call quality associated with the smart watch 412 when the smart watch 412 was most recently located at the gym.

In another example, the wireless device 404 may determine an expected data rate associated with the smart watch 412 at a location associated with the upcoming event. A data rate may indicate an uplink and/or downlink speed (e.g., in kilobytes per second) experienced by the smart watch 412 at a location. In one aspect, the wireless device 404 may determine an expected data rate associated with the smart watch 412 at a location associated with the upcoming event by querying a server or cloud-based system. In another aspect, the wireless device 404 may determine the expected data rate associated with the smart watch 412 at a location associated with the upcoming event by observing the data rate associated with the smart watch 412 when the smart watch 412 was most recently at the location associated with the upcoming event. For example, the wireless device 404 may observe the data rate associated with the smart watch 412 when the smart watch 412 was at a location associated with the gym. Accordingly, the wireless device 404 may determine the expected data rate associated with the smart watch 412 when the upcoming event includes the gym by determining the data rate associated with the smart watch 412 when the smart watch 412 was most recently located at the gym.

After the wireless device 404 determines that at least one selected device is disconnected from the wireless device 404 and selects a device from the set of devices associated with the at least one device type, the wireless device 404 may provide an indication 406 of the selected device associated with the at least one device type. In an aspect, the indication 406 may indicate that the at least one selected device is disconnected from the wireless device 404. For example, the wireless device 404 may determine that the device type 418 is disconnected from the wireless device 404 when the upcoming event includes the gym. The wireless device 404 may select the first headset 414 from the set of headsets 414, 416 associated with the device type 418. Subsequently, the wireless device 404 may provide an indication 406 indicating that the selected first headset 414 is disconnected from the wireless device 404.

The wireless device 404 may provide the indication 406 according to various approaches. In one aspect, the wireless device 404 may provide the indication 406 as a visual indication, such as by presenting the indication 406 on a display of the wireless device 404. In another aspect, the wireless device 404 may provide the indication 406 as an audible indication, such as by playing an audible alert through speakers of the wireless device 404. In another aspect, the wireless device 404 may provide the indication 406 as a tactile indication, such as by causing a vibration motor of the wireless device 404 to vibrate the wireless device 404. In an aspect, the indication 406 may include one or more of the preceding aspects (e.g., the indication 406 may include both visual and a tactile indication).

Figure 5:
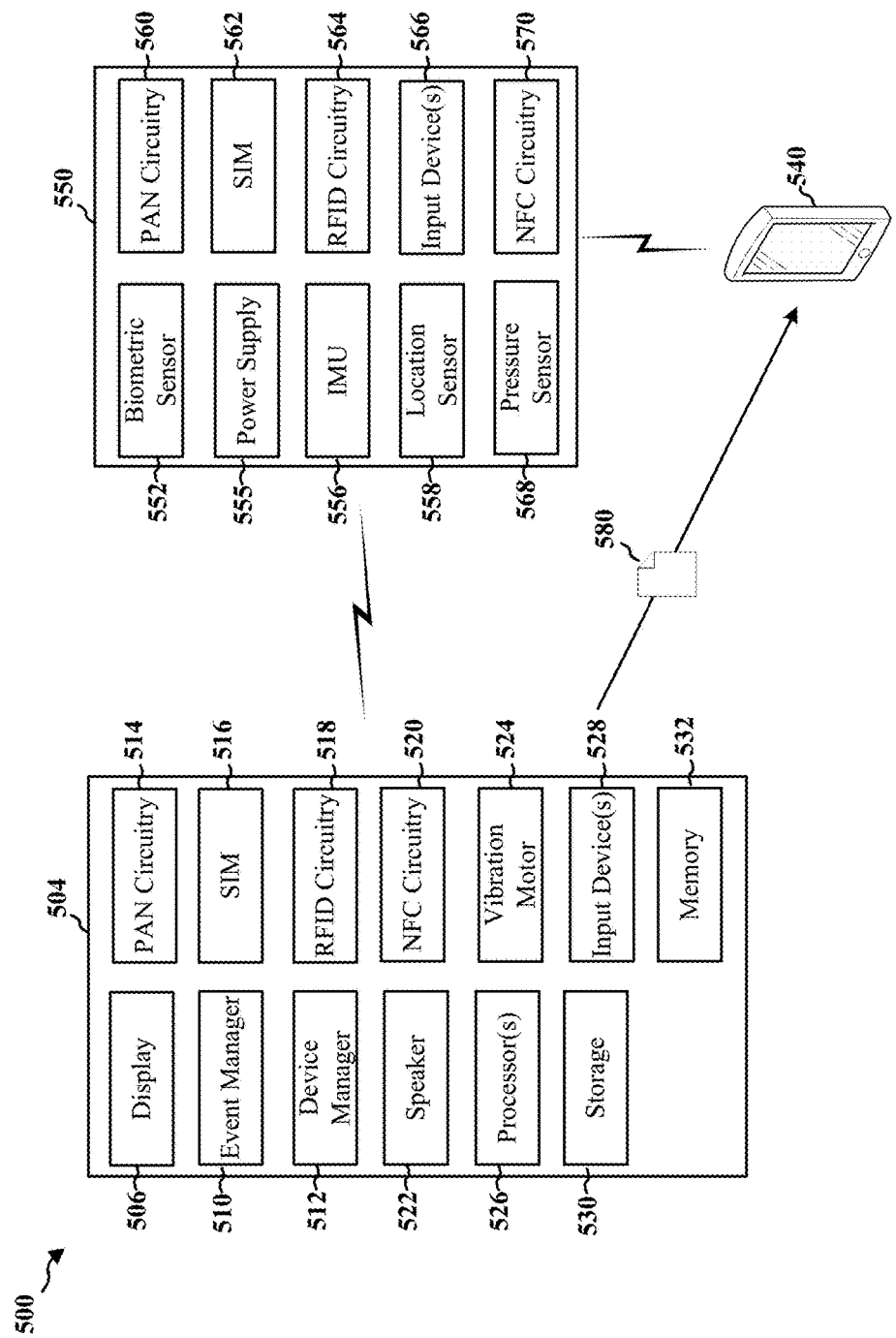
FIG. 5 is a diagram illustrating a wireless communications environment.

FIG. 5 is a diagram of a wireless communications environment 500. The wireless communications environment 500 may include a first wireless device 504, an event device 550, and a second wireless device 540. By way of example, the first wireless device 504 may be a UE or other smart phone, a tablet computer, a personal computer, or another processing system configured for wireless communication. The first wireless device 504 may be an aspect of the wireless device 404 described with respect to FIG. 4.

The first wireless device 504 may include a display 506, one or more speakers 522, a vibration motor (or piezoelectric crystal) 524, and one or more input devices 528 (e.g., touchscreen, keyboard, microphone, and/or another component configured to receive user input). The first wireless device may further include one or more processor(s) 526, storage 530 (e.g., non-volatile computer storage medium), and memory 532 (e.g., RAM).

The first wireless device 504 may configured with PAN circuitry 514, such as a Bluetooth module, FlashLinQ module, WiMedia module, ZigBee module, Wi-Fi module (e.g., for Wi-Fi Direct), etc. In one aspect, the first wireless device 504 may include a subscriber identity module (SIM) 516, which may identify and authenticate a subscription associated with the first wireless device 504 on a network (e.g., a cellular network, such as an LTE or 5G network). In one aspect, the first wireless device 504 may be configured with RFID circuitry 518 for reading and/or detecting electronic tags, such as RFID tags. In one aspect, the first wireless device 504 may include near field communication (NFC) circuitry 520 for NFC communication.

The first wireless device 504 may connect to the event device 550. The event device 550 may be any device configured to communicate with the first wireless device 504. For example, the event device 550 may be the smart watch 412, the first headset 414, or the second headset 416, described with respect to FIG. 4. In other examples, the event device 550 may be a UE or other smart phone, a tablet computer, a personal computer, or another processing system configured for wireless communication. In other examples, the event device 550 may be a credit card or key or other device configured with an RFID tag. In other examples, the event device 550 may be a camera, an activity tracker, a battery bank, a camera, a speaker system, etc.

In an aspect, the event device 550 may be configured with PAN circuitry 560, such as a Bluetooth module, FlashLinQ module, WiMedia module, ZigBee module, Wi-Fi module (e.g., for Wi-Fi Direct), etc. In one aspect, the event device 550 may include a SIM 562, which may identify and authenticate a subscription associated with the event device 550 on a network (e.g., a cellular network, such as an LTE or 5G network). In one aspect, the event device 550 may be configured with RFID circuitry 564, such as an RFID tag. In one aspect, the event device 550 may include near NFC circuitry 570 for NFC communication.

The event device 550 may further include at least one biometric sensor 552, at least one power supply 555, at least one inertial measurement unit (IMU) 556, at least one location sensor 558, at least one input device 566, and at least one pressure sensor 568. The biometric sensor 552 may include as a fingerprint sensor. The power supply 555 may include a battery. The IMU 556 may include at least one of an accelerometer, a gyroscope, and/or a magnetometer. The location sensor 558 may include circuitry configured to determine a location of the event device 550, such as GPS and/or location-sensing circuitry based on Wi-Fi signatures. The pressure sensor 568 may include circuitry configured to detect pressure applied to the event device 550, such as when a user grasps the event device 550 or applies pressure to the input device(s) 566 (e.g., pressure applied to a touchscreen). The input device(s) 566 may include a touchscreen, keyboard, microphone, and/or another component configured to receive user input.

The event device 550 may include more or fewer components than the components illustrated with respect to FIG. 5. For example, the event device 550 may include one or more processors, memory, and/or storage. In an aspect in which the event device 550 is a smart watch, the event device 550 may include a display. In another aspect in which the event device 550 is a credit card, the event device 550 may include RFID circuitry 564 (e.g., an RFID tag).

The first wireless device 504 may connect to the event device 550. For example, the PAN circuitry 514 of the first wireless device 504 may be configured to pair in a Bluetooth connection with PAN circuitry 560 of the event device 550. According to another example, the RFID circuitry 518 (e.g., an RFID reader) of the first wireless device 504 may be configured to read the data stored by the RFID circuitry (e.g., an RFID tag) of the event device 550. In other examples, the first wireless device 504 may connect to the event device 550 using a Wi-Fi connection, a Wi-Fi Direct connection, a LTE-Direct connection, a device-to-device (D2D) connection, a NFC connection, or any other type of connection suitable for a close range, for example, a range of approximately one hundred meters or an even greater range in the case of other technologies (e.g., a range of approximately two hundred meters for Wi-Fi Direct).

The first wireless device 504 may include an event manager 510. The event manager 510 may be implemented as hardware, software, and/or firmware. Various aspects of the event manager 510 may be executed by at least one processor 526.

The event manager 510 may include events associated with a user of the first wireless device 504. For example, the event manager 510 may include a calendar and/or a schedule that indicates events for the user. In an aspect, the event manager 510 may add events that are received as manual input (e.g., through input device(s) 528). In another aspect, the event manager 510 may add events that are received through messaging, such as email messaging, instant messaging, or text messaging. In another aspect, the event manager 510 may add an event based on collection of data. For example, the event manager 510 may observe trends and add an event based on an observed trend, such as when the first wireless device 504 is located at a specific location at a specific time for a plurality of occurrences (e.g., days).

The first wireless device 504 may further include a device manager 512. The device manager 512 may be implemented as hardware, software, and/or firmware. Various aspects of the device manager 512 may be executed by the at least one processor 526.

The device manager 512 may be configured to manage a sets of devices associated with sets of devices types. For example, the device manager 512 may be configured to store information associated with the event device 550. The device manager 512 may store information related to the device type associated with the event device 550—e.g., the event device 550 may include headphones of device type headset, the event device 550 may include a smart watch of device type activity tracker and/or device type smart watch, etc.

The device manager 512 may store information related to the connection type used to connect to the event device 550—e.g., Bluetooth, RFID, etc. The device manager 512 may store information related to the parameters associated with the event device 550. A set of parameters associated with the event device 550 may include a battery condition of the event device 550, a data balance associated with the event device 550, a voice balance associated with the event device 550, an expected network coverage associated with the event device 550 at one or more locations, an expected call quality associated with the event device 550 at one or more locations, an expected data rate associated with the event device 550 at one or more locations, a protocol compatibility between the first wireless device 504 and the event device 550, types of ports and/or availability of ports of the first wireless device 504 (e.g., whether the first wireless device 504 includes an available port compatible with a port of the event device 550), OS compatibility (e.g., whether the first wireless device 504 includes an OS that is compatible with an OS of the event device 550), whether the event device 550 is currently in use or reserved for a time period, and/or other parameters. The device manager 512 may detect such information when the event device 550 is more recently connected to the first wireless device 504. When the device manager 512 stores information related to a location, the device manager 512 may detect such information (e.g., network coverage, call quality, data rate, etc.) when the event device 550 is connected to the first wireless device 504 and the first wireless device 504 is located at the location (e.g., as determined by the first wireless device 504 and/or as received from a location sensor 558 of the event device 550).

The event manager 510 may determine an upcoming event, such as a calendar event scheduled for a user of the first wireless device 504. For example, the event manager 510 may select an upcoming event based on the current time and a first event, such as a calendar event scheduled for the user of the first wireless device 504. The event manager 510 may determine that the first event is an upcoming event, for example, when the time for which the first event is scheduled is within a threshold amount of time with respect to the current time. The upcoming event may be a time period during which at least one device type has been or is to be connected to the first wireless device 504. The event manager 510 may indicate the upcoming event to the device manager 512.

The device manager 512 may identify a set of device types associated with the upcoming event. For example, the device manager 512 may identify a device type, associated with the upcoming event, that includes the event device 550. According to a first example, the upcoming event may include a workout scheduled at a gym and the event device 550 may include a smart watch that is included in a device type of activity tracker. Further to such a first example, the device manager 512 may identify an activity tracker device type associated with the upcoming workout scheduled at the gym.

In one aspect, the device manager 512 may include a lookup table, which may store information related to device types associated with various events. Table 1 illustrates an example of such a lookup table. The device manager 512 may dynamically update the lookup table, such as through input (e.g., through input device(s) 528) and/or by observing trends (e.g., detecting what devices are connected to the first wireless device 504 during one or more events). For example, the device manager 512 may receive input through input device(s) 528 that indicates a user selection of a set of device types. Further, the device manager 512 may determine one or more events with which each device type of the set of device types is associated, such as by receiving input through input device(s) 528 that indicates a user selection of the one or more events or by observing trends indicating which device types were previously connected to the first wireless device 504 during one or more events. According to an aspect, the device manager 512 may determine the set of device types associated with an upcoming event based on device list indicated in the lookup table.

TABLE 1

| Activity | Set of Device Types |
| --- | --- |
| Gym | Personal smartphone, activity tracker, headset |
| Shopping/ Outdoor Event | Credit card, battery bank, car keys |
| Picnic | Camera, Speaker system |

The device manager 512 may determine that at least one device type of the set of device types is disconnected from the first wireless device 504. That is, the device manager 512 may determine that no devices are connected to the first wireless device 504 or the device manager 512 may determine that the devices connected to the first wireless device 504 are not stored in association with the at least one device type. Continuing with the aforementioned first example, the device manager 512 may determine that no devices stored as associated with an activity tracker device type are connected to the first wireless device 504.

The device manager 512 may select a device from a set of devices associated with the at least one device type based on a subset of a set of parameters. As described, supra, the device manager 512 may store a set of parameters associated with each device. The device manager 512 may select a device from a set of devices associated with the at least one device type based on a set of parameters stored for each device of the set of devices associated with the at least one device type. Continuing with the aforementioned example, the device manager 512 may select the event device 550 based on a subset of a set of parameters associated with the event device 550, such as a battery condition, a data balance, a voice balance, an expected network coverage at a location of the upcoming event, an expected call quality at a location of the upcoming event, an expected data rate at a location of the upcoming event, protocol compatibility between the first wireless device 504 and the event device 550, port availability and/or compatibility between the first wireless device 504 and the event device 550, OS or other application compatibility between the first wireless device and the event device 550, or the like.

In one aspect, the device manager 512 may select a device from the set of devices associated with the at least one device type by comparing respective parameters associated with respective devices. For example, the device manager 512 may compare a first battery condition associated with the power supply 555 of the event device 550 with a second battery condition associated with another power supply of another event device, and the device manager 512 may select the event device 550 when the event device 550 is associated with a better battery condition than the other event device (e.g., when the event device 550 has a greater amount of power remaining).

In another aspect, the device manager 512 may compute a value or score indicative of one or more parameters associated with the event device 550 and compare the computed value or score to another value or score computed for another event device. Accordingly, the device manager 512 may weigh a plurality of parameters associated with event devices in order to select an event device estimated to be a "best" choice for a user. In an aspect, the device manager 512 may assign different weights to different parameters in order to compute a weighted value or score, which may reflect the relative importance of the different parameters.

In one aspect, the device manager 512 may select a device from a set of devices based on the subset of the set of parameters and further based on the determination that at least one device type of the set of device types is disconnected from the device. For example, once the device manager 512 determines that the at least one selected device is disconnected from the first wireless device 504, the device manager 512 may then select a device from a set of devices associated with the at least one device type based on the subset of the set of parameters.

The device manager 512 may provide an indication that indicates the selected device is disconnected and/or the at least one device type with which the selected device is associated is disconnected. For example, the device manager 512 may provide an indication that indicates the specific event device 550 is disconnected from the first wireless device 504 and/or the device manager 512 may provide an indication that indicates that the device type associated with the event device 550 is disconnected from the first wireless device 504.

In various aspects, the device manager 512 may provide the indication as a visual alert. For example, the device manager 512 may cause a display 506 of the first wireless device 504 to present the indication. In another aspect, the device manager 512 may provide the indication as an audio alert. For example, the device manager 512 may cause one or more speakers 522 of the first wireless device 504 to present the indication. In another aspect, the device manager 512 may provide the indication as a tactile indication. For example, the device manager 512 may cause a vibration motor 524 of the first wireless device 504 to vibrate the first wireless device 504. In an aspect, the device manager 512 may provide an indication that includes one or more of the preceding aspects (e.g., the indication may include both a visual indication and a tactile indication).

In an aspect, the device manager 512 may be configured to provide the indication before the upcoming event. For example, the device manager 512 may be configured to select the device based on the subset of the set of parameters before the upcoming event and then provide the indication that the selected device is disconnected from the first wireless device 504 before the upcoming event. How long before the upcoming event the indication is provided may be configured by a parameter, which may indicate a time value (e.g., five minutes) before the upcoming event at which the indication should be provided.

Because the device manager 512 may determine a plurality of device types and, therefore, may select a plurality of devices associated with a respective device type, the device manager 512 may provide an indication of a plurality of selected devices. For example, when the upcoming event includes the gym, the set of devices types may include a headset and an activity tracker. The device manager 512 may provide an indication that indicates a selected headset device associated with the headset device type and a selected activity tracker device associated with the activity tracker device type.

In one aspect, the device manager 512 may store information indicating a last-known location of the event device 550. For example, the device manager 512 may store information indicating the location of first wireless device 504 and/or the event device 550 when the event device 550 was most recently connected to the first wireless device 504. In various aspect, the device manager 512 may provide an indication that indicates the location of the first wireless device 504 and/or the event device 550 when the event device 550 was most recently connected to the first wireless device 504.

In various aspects, a device may be shared among multiple users. For example, a wireless headphone device associated with a headset device type may be shared among multiple users, a smart watch device included in an activity tracker device type may be shared among multiple users, and so forth. In the illustrated aspect, a second wireless device 540 may also connect to the event device 550. Similar to the first wireless device 504, the second wireless device 540 may be a UE or other smart phone, a tablet computer, a personal computer, or another processing system configured for wireless communication. However, the second wireless device 540 may be associated with another user that is different from the user of the first wireless device 504 and, therefore, may include another event manager to manage events of the another user.

In an aspect, the device manager 512 may determine that the event device 550 is in use or will be in use for at least a portion of the duration of the upcoming event. For example, the device manager 512 may detect that the event device 550 is connected to the second wireless device 540. In another example, the device manager 512 may determine that the event device 550 is reserved by the second wireless device 540. That is, the device manager 512 may determine that the event device 550 is reserved during a time period that at least partially overlaps with the duration of the upcoming event. The device manager 512 may determine that the event device 550 is in use or will be in use by receiving an indication that event device 550 is in use or will be in use during at least a portion of the duration of the upcoming event. The device manager 512 may receive such an indication from the event device 550, from the second wireless device 540, and/or from a server or cloud-based system.

When the device manager 512 determines that the event device 550 is in use or will be in use for at least a portion of the duration of the upcoming event, the device manager 512 may attempt to select another device associated with the device type that is associated with the event device 550. For example, the device manager 512 may determine that a parameter of the set of parameters associated with the event device 550 indicates whether the event device 550 is in use or will be in use for at least a portion of the duration of the upcoming event. The device manager 512 may select another device associated with the device type based on a parameter that indicates the event device 550 is in use or will be in use for at least a portion of the duration of the upcoming event. The device manager 512 may then provide an indication of the another selected device.

The device manager 512 may provide a notification that the event device 550 is in use or will be in use for at least a portion of the duration of the upcoming event. The device manager 512 may provide such a notification as a visual notification presented on the display 506, an audio notification output through the speakers 522, and/or a tactile notification caused by the vibration motor 524. In one aspect, the device manager 512 may provide such a notification when the device manager 512 provides the indication that indicates the selected event device 550 is disconnected.

In one aspect, the device manager 512 may determine information associated with the second wireless device 540 and/or the user of the second wireless device 540. For example, the device manager 512 may receive information associated with the second wireless device 540 and/or the user of the second wireless device 540 from the event device 550, from the second wireless device 540, and/or from a server or cloud-based system. The device manager 512 may provide information associated with the second wireless device 540 and/or the user of the second wireless device 540 when the device manager 512 provides the notification that the event device 550 is in use or will be in use for at least a portion of the duration of the upcoming event. The information associated with the second device may include information identifying the second wireless device 540 and/or information identifying the user of the second wireless device 540, for example, so that the user of the first wireless device 504 and the user of the second wireless device 540 may negotiate usage of the event device 550 offline.

Because the event device 550 may be shared between respective users of the first wireless device 504 and the second wireless device 540, the device manager 512 may reserve the event device 550. For example, the device manager 512 may reserve the event device 550 for an upcoming event that is associated with a device type of the event device 550. In one aspect, the device manager 512 may determine that the event device 550 is shared among multiple users, such as by receiving input indicating that the event device 550 is shared among multiple users. The device manager 512 may determine, from the event manager 510, one or more events associated with the device type of the event device 550. Accordingly, the device manager 512 may reserve the event device 550 for a respective duration of the one or more events (e.g., a duration may be the period of time from a start time to an end time of a scheduled event in a calendar maintained by the event manager 510).

In one aspect, the device manager 512 may reserve the event device 550 by storing data indicating that the event device 550 is reserved for one or more events. In an aspect, the device manager 512 may reserve the event device 550 by sending an indication of the reservation to the event device 550, which the event device 550 may store. In another aspect, the device manager 512 may reserve the event device 550 by sending an indication of the reservation to a server or cloud-based system that communicates with the first wireless device 504 and the second wireless device 540.

According to an aspect, the device manager 512 may reserve the event device 550 by sending a notification 580 to the second wireless device 540. The notification 580 may indicate that the event device 550 will be in use for the duration of the upcoming event. In one aspect, the device manager 512 may generate and send the notification 580 to the second wireless device 540 as a message, such as a text message or instant message. In another aspect, the device manager 512 may generate and send the notification 580 to the second wireless device 540 through a server or cloud-based system that communicates with the first wireless device 504 and the second wireless device 540.

In one aspect, the device manager 512 may autonomously reserve the event device 550. That is, the device manager 512 may reserve the event device 550 without receiving input from a user instructing the device manager 512 to reserve the event device 550. The device manager 512 may autonomously reserve the event device 550 based on stored data associated with usage of the event device 550, such as historical data associated with connection of the event device 550 to the first wireless device 504. For example, the device manager 512 may store data reflecting that the event device 550 is frequently connected to the first wireless device 504 during a one or more occurrences of a certain event. Accordingly, when a next occurrence of the certain event is scheduled through the event manager 510, the device manager 512 may autonomously identify the event device 550 as associated with that next occurrence of the certain event.

For example, the device manager 512 may detect whether the event device 550 is connected to the first wireless device 504 during one or more occurrences of a certain event. For each occurrence of the certain event, the device manager 512 may store information indicating whether the event device 550 is connected to the first wireless device 504. Based on this historical data, the device manager 512 may determine the number of times the event device 550 was connected to the first wireless device 504 during past occurrences of the certain event. The device manager 512 may compare that number to a threshold. If the number of the number of times the event device 550 was connected to the first wireless device 504 during past occurrences of the certain event meets or exceeds the threshold, then the device manager 512 may determine that the event device 550 is associated with that certain event. Accordingly, when a next occurrence of the certain event is scheduled through the event manager 510, the device manager 512 may autonomously reserve the event device 550 for the next occurrence of the event.

In one aspect, the device manager 512 may provide an indication of the autonomous reservation. For example, the device manager 512 may present, on the display 506, information indicating that the event device 550 has been autonomously reserved for an event scheduled through the event manager 510. The indication of the autonomous reservation may inform a user of the first wireless device 504 of the autonomous reservation. In an aspect, the device manager 512 may provide a prompt (e.g., on the display 506) in order to receive input through input device(s) 528 that confirms the autonomous reservation.

In an aspect, the device manager 512 may determine that another reservation associated with the event device 550 conflicts with the autonomous reservation. For example, the device manager 512 may determine that the second wireless device 540 has reserved the event device 550 during a time period that conflicts with the autonomous reservation (e.g., the attempted reservation by the second wireless device 540 at least partially overlaps with a time period of the autonomous reservation). For example, the device manager 512 may receive information indicating the attempted reservation by the second wireless device 540 from the event device 550, from the second wireless device 540, and/or from a server or cloud-based system.

Based on the determination that the other reservation associated with the event device 550 conflicts with the autonomous reservation, the device manager 512 may provide a notification of the attempted reservation by the second wireless device 540 that conflicts with the autonomous reservation, such as by presenting a visual notification on the display 506. In another aspect, the device manager 512 may send a notification to the second wireless device 540 in order to inform the second wireless device 540 of the autonomous reservation. By providing at least one of a notification at the first wireless device 504 and/or a notification at the second wireless device 540, the user of the first wireless device 504 and the user of the second wireless device 540 may negotiate usage of the event device 550 offline.

In various aspects, a current user of the event device 550 may be authenticated, e.g., in order to determine that the current user is one who should possess the event device 550 during an upcoming event. For example, the event device 550 may be determined to be in possession of a user who reserved the event device 550 for an upcoming event. In various aspect, the device manager 512 may determine whether the user reserving the event device 550 is authenticated.

In one aspect, the device manager 512 may receive, from the event device 550, characteristic data detected for a user of the event device 550. In an aspect, the characteristic data may include biometric data detected by at least one biometric sensor 552 of the event device 550. The biometric data may include raw sensor data and/or processed data. In another aspect, the characteristic data may include data indicating how the event device 550 is moving, as detected by the IMU 556 (e.g., data indicating movement of the event device 550 caused by the current user). In another aspect, the characteristic data may include data indicating pressure as detected by the pressure sensor 568 (e.g., data indicating pressure applied to the event device 550 and/or data indicating how the event device 550 is being held or grasped by the current user). In another aspect, the characteristic data may include data indicating input characteristics as detected through the input device(s) 566 (e.g., data indicating frequent inputs or input methods).

In another aspect, the device manager 512 may receive characteristic data that includes information identifying the current user of the event device 550 (e.g., input used to login to the event device 550). The information may be received from the event device 550 or from a server or cloud-based system configured to communicate with the first wireless device 504 and the event device 550. The device manager 512 may determine if the information identifying the current user matches information corresponding to authenticated users (e.g., if a username used for login appears in a stored list of authenticated users). If the information identifying the current user corresponds to or matches information associated with an authenticated user, then the device manager 512 may determine that the current user is authenticated.

The device manager 512 may receive the characteristic data and apply one or more algorithms to the characteristic data in order to identify the current user of the event device 550 and to determine whether the current user is authenticated for use of the event device 550. For example, the device manager 512 may apply one or more algorithms that compare characteristic data to stored data associated with one or more authenticated users. If the characteristic data matches stored data associated with an authenticated user, then the device manager 512 may determine that the current user is authenticated.

The device manager 512 may determine whether a current user of the event device 550 is authenticated by determining that the current user corresponds to a user of the first wireless device 504. For example, the device manager 512 may store information associated with the user of the first wireless device 504. The device manager 512 may compare the stored information associated with the user of the first wireless device 504 to characteristic data associated with the current user of the event device 550. Based on the comparison, the device manager 512 may determine whether the current user of the event device 550 is authenticated. If the stored data associated with the user of the first wireless device 504 is determined to match the characteristic data associated with the current user of the event device 550, then the device manager 512 may determine that the current user of the event device 550 is authenticated. If the stored data associated with the user of the first wireless device 504 is determined not to match the characteristic data associated with the current user of the event device 550, then the device manager 512 may determine that the current user of the event device 550 is unauthenticated.

In another aspect, the device manager 512 may receive information indicating whether the current user of the event device 550 is authenticated. The information may include, for example, a Boolean value indicating whether the current user is authenticated. The information may be received from the event device 550 or from a server or cloud-based system configured to communicate with the first wireless device 504 and the event device 550.

In one aspect, the event device 550 may be configured to authenticate a current user. The event device 550 may store information indicating that the event device 550 is reserved for a duration of an upcoming event, which may be received from the first wireless device 504. The event device 550 may authenticate the current user of the event device 550 when a current time corresponds to a start time of the upcoming event or when a current time is within a threshold amount of time from a start of the upcoming event.

The event device 550 may store information identifying a user of the first wireless device 504. The event device 550 may detect characteristic data of a current user of the event device 550, as described supra, such as biometric data as detected by the biometric sensor 552, pressure applied to the event device 550 as detected by the pressure sensor 568, movement of the event device 550 as detected by the IMU 556, and the like. The event device 550 may compare the stored information identifying the user of the first wireless device 504 to the characteristic data associated with the current user of the event device 550 in order to determine if the current user of the event device 550 is authenticated.

If the event device 550 determines that the current user of the event device 550 is unauthenticated, then the event device 550 may send a message to the first wireless device 504 indicating that the current user is unauthenticated. For example, the event device 550 may send an instant message or text message to the first wireless device 504 using a cellular network accessed through the SIM 562. According to another example, the event device 550 may send a message to a server or cloud-based system using a wide-area network, and the server or cloud-based system may provide the message to the first wireless device 504.

If the device manager 512 determines that the current user of the event device 550 is authenticated, then the device manager 512 may take no action, for example, because the current user of the event device 550 has reserved the event device 550. If the device manager 512 determines that the current user of the event device 550 is unauthenticated, then the device manager 512 may provide a notification associated with the unauthenticated current user of the event device 550.

In one aspect, the device manager 512 may provide a notification to a user of the first wireless device 504, such as by presenting the notification on the display. In an aspect, the device manager 512 may provide a notification that includes information identifying the current user of the event device 550 (e.g., based on the characteristic data, based on information received from the event device 550 via a cellular or wide-area network, based on information associated with the current user of the event device 550 received from a server or cloud-based system, etc.). In an aspect, the device manager 512 may provide a notification that includes information identifying a current location of the event device 550 (e.g., based on location information received from the event device 550 via a cellular or wide-area network, based on location information received from a server or cloud-based system for the event device 550, etc.). In one aspect, the device manager 512 may provide the notification associated with the unauthenticated current user of the event device 550 together with the indication that the event device 550 is disconnected from the first wireless device 504.

In one aspect, the device manager 512 may send a notification to the event device 550 indicating that the event device 550 has been reserved and/or indicating that the current user of the event device 550 is unauthenticated. For example, the notification may include information identifying a user of the first wireless device 504. According to an aspect, the device manager 512 may send the notification to the event device 550 via a cellular or wide-area network. According to another aspect, the device manager 512 may send the notification to the event device 550 through a server or cloud-based system.

In an aspect, the device manager 512 may determine whether the current user of the event device 550 is authenticated based on an upcoming event. For example, when the event device 550 is determined to be disconnected from the first wireless device 504 within a threshold duration before the upcoming event, the device manager 512 may determine whether the current user of the event device 550 is authenticated. For example, the device manager 512 may request characteristic data from the event device 550 (e.g., through a server or cloud-based system, through a cellular or wide-area network to which the event device 550 is connected) when a current time is within a threshold before the upcoming event.

Figure 6:
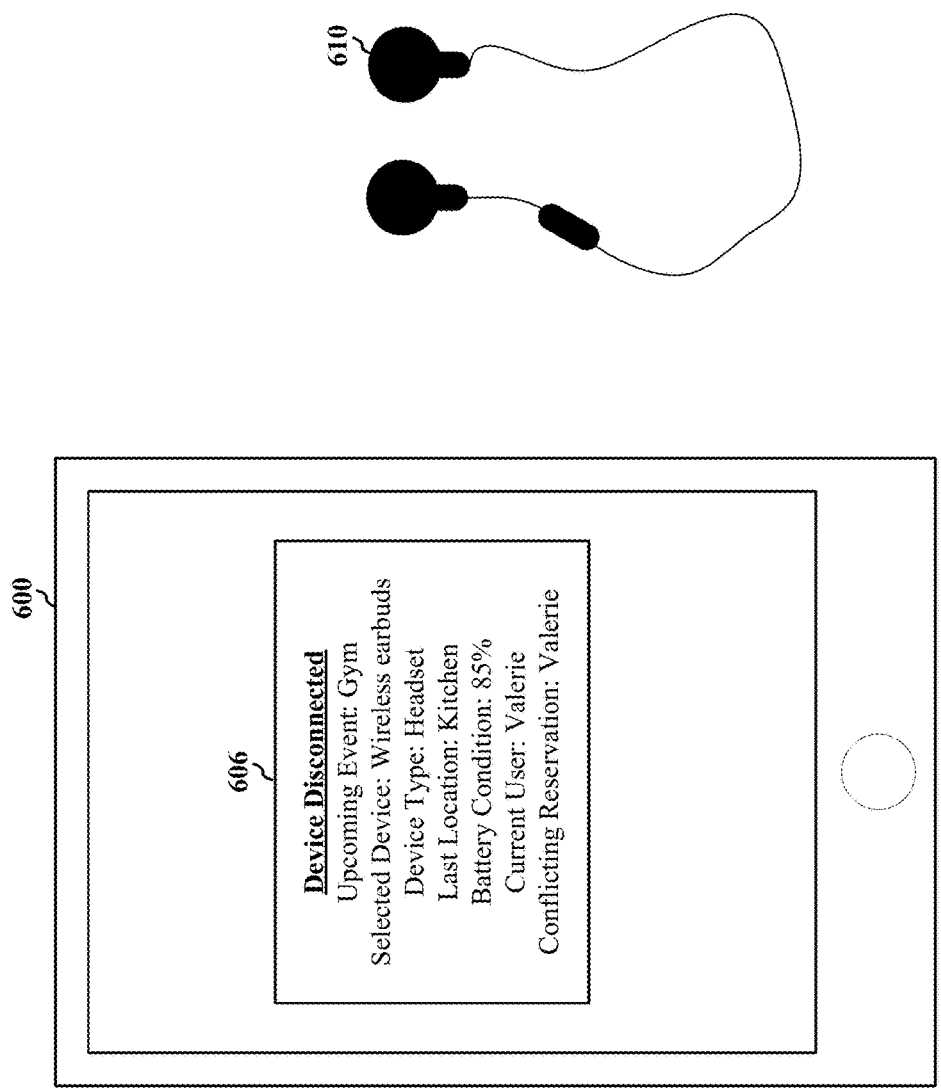
FIG. 6 is a diagram illustrating a wireless device.

FIG. 6 illustrates a wireless device 600 that displays an indication 606 that indicates a selected device is disconnected from the wireless device 600. The wireless device 600 may be, for example, the UE 104, the wireless device 404, and/or the first wireless device 504.

According to the illustrated aspect, the wireless device 600 may identify a set of device types associated with an upcoming event. For example, the wireless device 600 may determine at least a headset device type associated with an upcoming event that includes the gym.

The wireless device 600 may determine that at least one device type of the set of device types is disconnected from the wireless device 600. For example, the wireless device 600 may determine that a headset device type associated with the gym upcoming event is disconnected from the wireless device 600.

The wireless device 600 may select, based on a subset of a set of parameters, a device 610 from a set of devices associated with the at least one device type determined to be disconnected from the wireless device 600. The set of parameters may include a battery level or condition (e.g., available power) of the device 610, a data balance associated with the device 610, a voice balance associated with the device 610, an expected network coverage associated with the device 610 at a location of the upcoming event, an expected call quality associated with the device 610 at a location of the upcoming event, an expected data rate associated with the device 610 at a location of the upcoming event, protocol compatibility between the wireless device 404 and the device 610, types of ports and/or availability of ports of the wireless device 600 (e.g., whether the wireless device 600 includes an available port suitable for a connection to the device 610), OS or other application compatibility (e.g., whether the wireless device 600 includes an OS or other application that is compatible with an OS of the device 610), whether the device 610 is in use or reserved when the upcoming event is scheduled to begin, or another parameter.

For example, the wireless device 600 may select a wireless earbuds device 610 from a set of headset devices associated with the headset device type based on a subset of a set of parameters. The wireless device 600 may select the wireless earbuds device 610 based on a battery condition parameter of the wireless earbuds, for example, by determining that the battery condition of the wireless earbuds device 610 is greater than a battery condition of another headset device associated with the headset device type. Further, the wireless device 600 may select the wireless earbuds device 610 by determining that a port (e.g., a Lightning jack) configured to receive wired devices associated with the headset device types is unavailable and, therefore, the wireless device 600 may select wireless devices (including the wireless earbuds device 610) associated with the headset device type.

The wireless device 600 may provide an indication 606 of the selected device 610, which may indicate that the at least one selected device is disconnected from the wireless device 600. In the illustrated aspect, the wireless device 600 may present the indication 606 on a display of the wireless device 600.

For example, the wireless device 600 may display an indication 606 that indicates the selected wireless earbuds device 610 is disconnected from the wireless device 600 for the upcoming event of the "gym." The wireless device 600 may provide the indication 606 that indicates the selected device 610 of "wireless earbuds." The wireless device 600 may provide the indication 606 that indicates the device type of "headset" that is associated with the upcoming event. The wireless device 600 may provide the indication 606 that indicates the last location of the selected device 610 (e.g., the location when the selected device was most recently connected to the wireless device 600) is "kitchen." The wireless device 600 may provide the indication 606 that indicates one or more parameters of the subset of the set of parameters upon which selection of the selected device 610 is based, such as a battery condition of "85%" for the selected device 610. The wireless device 600 may provide the indication 606 that indicates the selected device 610 is currently in use by another user "Valerie." The wireless device 600 may provide the indication 606 that indicates the selected device 610 is reserved during a time period that conflicts with the upcoming event associated with which the headset device type is associated.

The indication 606 is to be regarded as illustrative. Accordingly, the indication 606 may include more or less information. For example, the indication 606 may omit information related to a last location if the last location is unknown. Similarly, the indication 606 may omit information related to a current user and/or conflicting reservation if such information is unknown or inapplicable.

Figure 7:
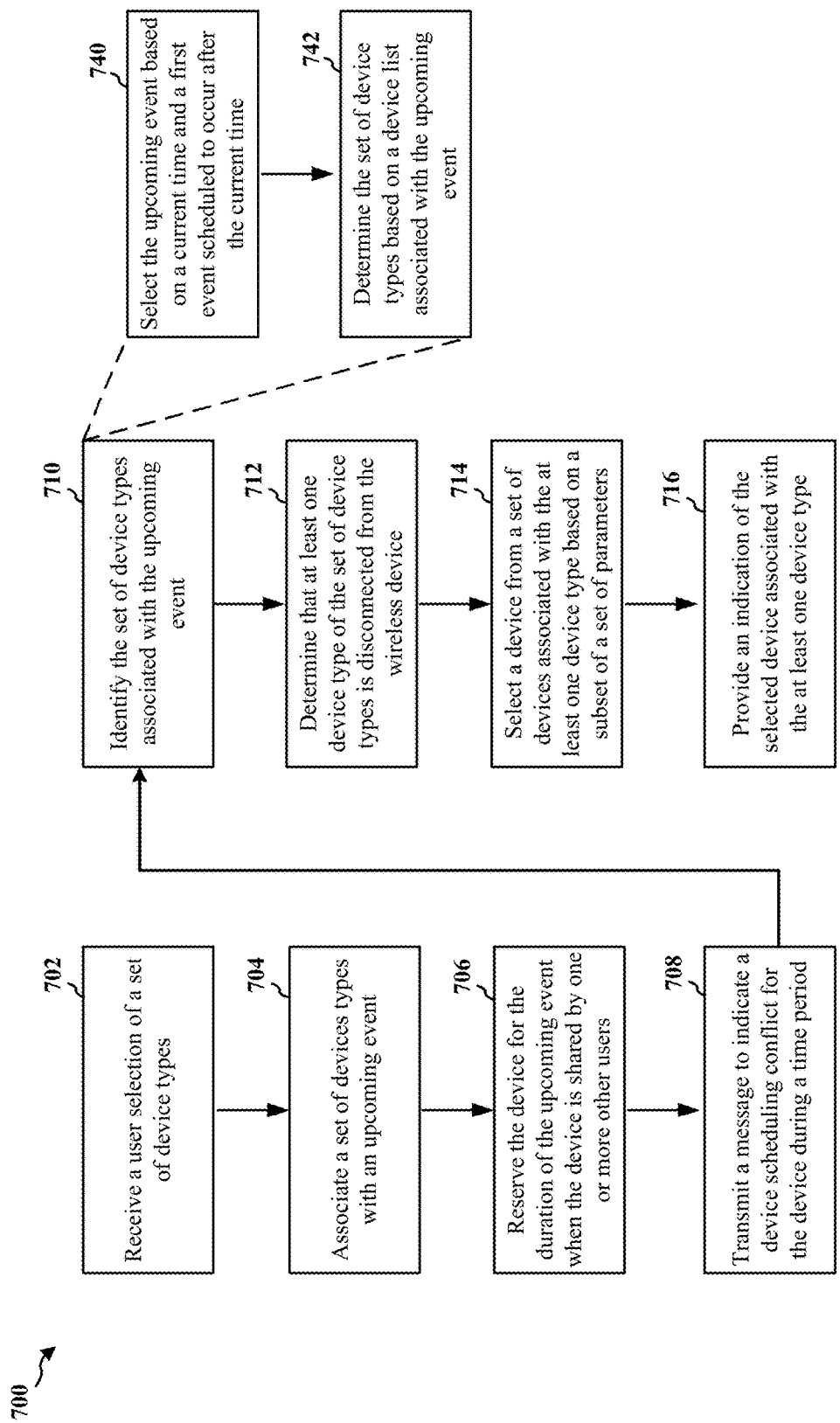
FIG. 7 is a flowchart illustrating a method of wireless communication.

FIG. 7 is a flowchart of a method 700 of wireless communication. The method may be performed by a wireless device (e.g., the UE 104, the wireless device 404, the first wireless device 504, the wireless device 600, the apparatus 902/902'). According to various aspects, one or more of the illustrated operations may be omitted, transposed, and/or contemporaneous. In an aspect, additional operations may be implemented.

At operation 702, the wireless device may receive a user selection of a set of device types. For example, the wireless device may receive input through an input device associated with the wireless device and the wireless device may identify one or more device types corresponding to the received input, which indicates a user selection of the one or more device types.

In the context of FIG. 4, the wireless device 404 may receive a selection from the user 402 of the device type 418. In the context of FIG. 5, the device manager 512 may receive a user selection of a set of device types, which may include a device type associated with the event device 550. The device manager 512 may store the user selection of the set of device types in a lookup table. In the context of FIG. 6, the wireless device 600 may receive a user selection of set of device types, which may include a device type associated with the wireless earbuds device 610.

At operation 704, the wireless device may associate a set of device types with an upcoming event. For example, the wireless device identify at least one device type that should be connected to the wireless device during an upcoming event, and the wireless device may store the identified at least one device type in a lookup table that maps the upcoming event to the at least one identified device type. In one aspect, the wireless device may associate the set of device types with the upcoming event based on user input— e.g., the wireless device may receive user input that indicates at least one device type is to be associated with the upcoming event. In another aspect, the wireless device may associate the set of device types with the upcoming event based on historical data indicating that the set of device types was previously connected to the wireless device during one or more past events similar to the upcoming event. For example, the wireless device may associate at least one device type with the upcoming event when the at least one device type was previously connected to the wireless device during a threshold number of past occurrences of an event that is similar to the upcoming event.

In the context of FIG. 4, the wireless device 404 may associate the device type 418 with an upcoming event scheduled for the user 402. In the context of FIG. 5, the device manager 512 may associate, with an upcoming event scheduled in the event manager 510, a device type with which the event device 550 is associated. For example, the device manager 512 may update a lookup table to reflect that a type of event (e.g., "gym," "shopping/outdoor event," "picnic") is associated with a device type with which the event device 550 is associated. In the context of FIG. 6, the wireless device 600 may associate an upcoming event with the device type with which the wireless earbuds device 610 is associated.

At operation 706, the wireless device may reserve the device for the duration of the upcoming event when the device is shared by other users. For example, the wireless device may determine that the device is to be used during the upcoming event, and the wireless device may generate a message that indicates the device is to be reserved for the duration of the upcoming event. The wireless device may transmit the message to another device in order to indicate the reservation—e.g., the wireless device may transmit the message to the device that is to be reserved, the wireless device may transmit the message to another wireless device that may share the device with the wireless device, and/or the wireless device may transmit the message to a server or cloud-based system configured to communicate with the wireless device.

In the context of FIG. 4, the wireless device 404 may reserve the first headset 414 for the duration of an upcoming event when the first headset 414 is shared by one or more other users. In the context of FIG. 5, the event manager 510 may provide a time period (e.g., a start time and duration) of an upcoming event to the device manager 512. The device manager 512 may reserve the event device 550 for the duration of the upcoming event beginning at the start time when the event device 550 is shared with the second wireless device 540. The device manager 512 may reserve the event device 550 by generating a message that indicates the reservation and transmitting the generated message to the event device 550, to the second wireless device 540, and/or to a server or cloud-based system. In the context of FIG. 6, the wireless device 600 may reserve the wireless earbuds device 610 for the duration of an upcoming event when the wireless earbuds device 610 is shared by one or more other users.

At operation 708, the wireless device may transmit a message to indicate a device scheduling conflict for the device during a time period, which may at least partially overlap with the duration of the upcoming event. For example, the wireless device may generate a message that indicates the reservation of the device and transmit the message to at least one of the device, another wireless device that may attempt to reserve the wireless device, and/or a server or cloud-based system.

In the context of FIG. 4, the wireless device 404 may transmit a message to indicate a device scheduling conflict for a period of time that at least partially overlaps with a duration of an upcoming event, for example, based on reservation of the first headset 414. In the context of FIG. 5, the device manager 512 may transmit, to the second wireless device 540, the notification 580 indicating that the event device 550 is reserved for a duration of an upcoming event.

In the context of FIG. 6, the wireless device 600 may transmit a message to indicate a device scheduling conflict for a period of time that at least partially overlaps with a duration of an upcoming event.

At operation 710, the wireless device may identify the set of device types associated with an upcoming event. For example, the wireless device may access a lookup table that maps devices types to events. The wireless device may determine an event in the lookup table that corresponds to the upcoming event, and then the wireless device may determine one or more device types associated with the event based on the lookup table.

In the context of FIG. 4, the wireless device 404 may identify the device type 418 associated with an upcoming event. In the context of FIG. 5, the device manager 512 may identify the device type, with which the event device 550 is associated, and the device type may be associated with an upcoming event indicated by the event manager 510. In the context of FIG. 6, the wireless device 600 may identify the device type that includes the wireless earbuds device 610 associated with an upcoming event.

In an aspect, operation 710 may include operation 740 and operation 742. At operation 740, the wireless device may select an upcoming event based on a current time and a first event scheduled to occur after the current time. For example, the wireless device may determine the current time and determine a start time of a first event. When the current time is within a threshold of the start time of the first event, the wireless device may select the first event as an upcoming event.

In the context of FIG. 4, the wireless device 404 may select an upcoming event based on a current time and a first event scheduled to occur after the current time. In the context of FIG. 5, the event manager 510 may selecting an upcoming event based on a current time and a first event scheduled to occur after the current time. In the context of FIG. 6, the wireless device 600 may select an upcoming event based on a current time and a first event scheduled to occur after the current time.

At operation 742, the wireless device may determine the set of device types based on a device list (e.g., a list of device types, a list of device types mapped to devices, a list mapping device types to events, etc.) associated with the upcoming event. For example, the wireless device may access a lookup table that maps events to device types. The wireless device may determine an event in the lookup table that corresponds to the upcoming event, and then the wireless device may determine one or more device types that are mapped to the determined event in the lookup table.

In the context of FIG. 4, the wireless device 404 may determine the device type 418 based on a device list associated with the upcoming event. In the context of FIG. 5, the device manager 512 may determine a set of device types that is associated with the event device 550 based on a lookup table that maps events to device types on a device list (see, e.g., Table 1). In the context of FIG. 6, the wireless device 600 may determine the set of device types based on a device list associated with the upcoming event.

At operation 712, the wireless device may determine that at least one device type of the set of device types is disconnected from the wireless device. For example, the wireless device may detect devices that are connected to the wireless device, and the wireless device may determine whether any of the detected devices are associated with a device type of the identified set of device types. If none of the detected devices are associated with a device type of the identified set of device types, then the wireless device may determine that at least one device type of the identified set of device types is disconnected from the wireless device.

In the context of FIG. 4, the wireless device 404 may determine that none of the devices connected to the wireless device 404 are of the device type 418, and so the device type 418 is disconnected from the wireless device. In the context of FIG. 5, the device manager 512 may determine that no devices connected to the first wireless device 504 are of the device type with which the event device 550 is associated, and so the device manager 512 may determine that at least one device type of the set of device types identified for the upcoming event is disconnected from the first wireless device 504. In the context of FIG. 6, the wireless device 600 may determine that no devices connected to the wireless device 600 are of the device type with which the wireless earbuds device 610 associated, and so the wireless device 600 may determine that at least one device type of the set of device types identified for the upcoming event is disconnected from the wireless device 600.

At operation 714, the wireless device may select a device from a set of device associated with the at least one device type based on a subset of a set of parameters. For example, wireless device may identify a set of parameters associated with a device. The set of parameters may include a battery level or condition (e.g., available power) of a device, a data balance associated with a device, a voice balance associated with a device, an expected network coverage associated with a device at a location of the upcoming event, an expected call quality associated with a device at a location of the upcoming event, an expected data rate associated with a device at a location of the upcoming event, protocol compatibility between the wireless device and a device, types of ports and/or availability of ports of the wireless device (e.g., whether the wireless device includes an available port suitable for a connection to a device), OS or other application compatibility (e.g., whether the wireless device includes an OS or other application that is compatible with an OS of a device), whether the device is in use or reserved, or another parameter. The wireless device may select a subset of the set of parameters for the device upon which selection of a device may be conditioned. The wireless device may then select the device based on the selected subset of parameters, such as by comparing the selected subset of parameters for the device to another subset of parameters for another device. In one aspect, the wireless device may select the device further based on the determination that the at least one device type of the set of device types is disconnected from the wireless device.

In the context of FIG. 4, the wireless device 404 may select the first wireless headset 414 from the set of wireless headsets 414, 416 associated with the device type 418 based on, for example, the battery condition of the first headset 414 compared to the battery condition of the second headset 416. In the context of FIG. 5, the device manager 512 may select the event device 550 from a set of devices associated with the at least one device type based on a subset of a set of parameters associated with the event device 550. In the context of FIG. 6, the wireless device 600 may select the wireless earbuds device 610 from a set of devices associated with the at least one device type based on a subset of a set of parameters associated with the wireless earbuds device 610.

At operation 716, the wireless device may provide an indication of the selected device associated with the at least one device type. In an aspect, the indication may indicate that the at least one selected device is disconnected from the wireless device. For example, the wireless device may generate an indication (e.g., a visual indication) and then the wireless device may present the indication (e.g., display the visual indication).

In the context of FIG. 4, the wireless device 404 may provide the indication 406, which may indicate the selected wireless headset 414 is disconnected from the wireless device 404. In the context of FIG. 5, the device manager 512 may provide an indication, which may indicate the selected event device 550 is disconnected from the first wireless device 504. In the context of FIG. 6, the wireless device 600 may present the indication 606, which may indicate that the wireless earbuds device 610 is disconnected from the wireless device 600.

Figure 8:
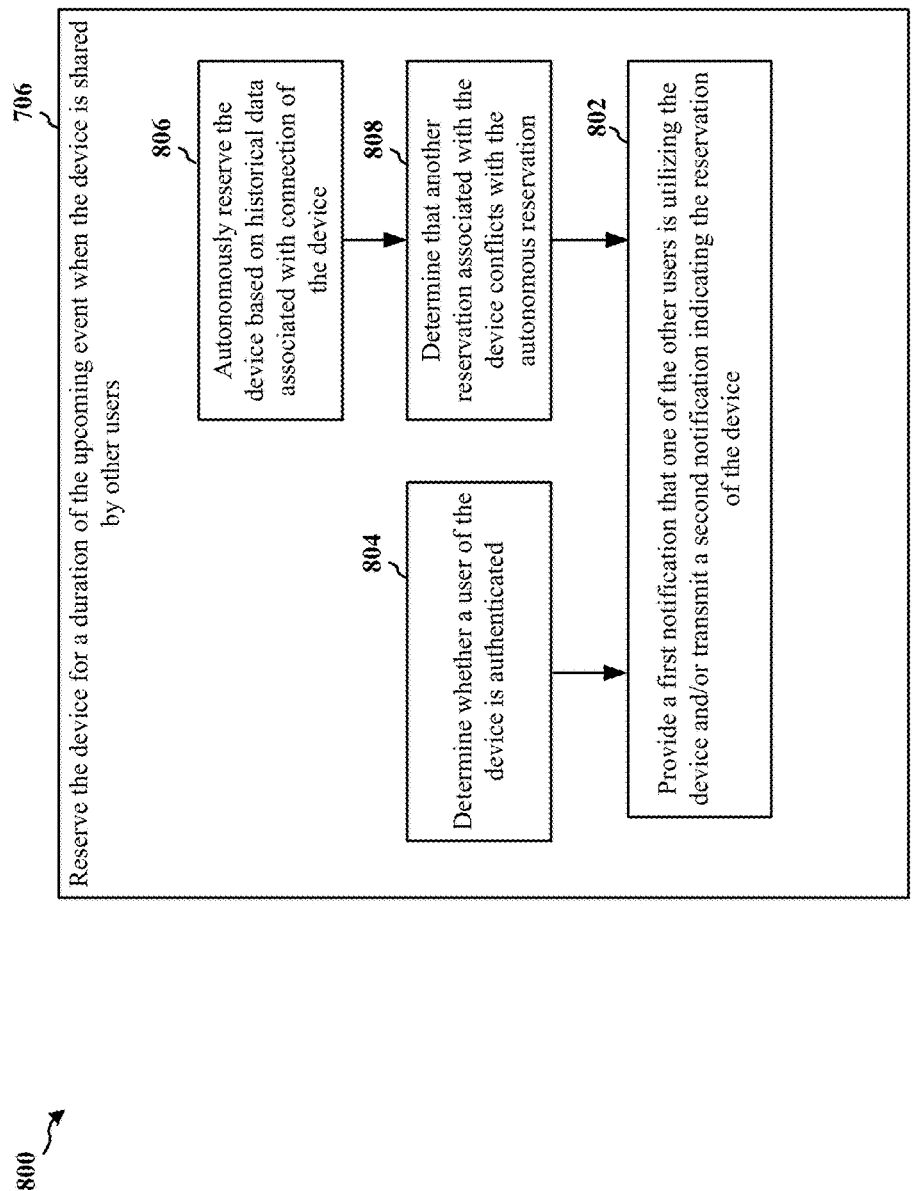
FIG. 8 is a flowchart illustrating a method of wireless communication.

FIG. 8 is a flowchart of a method 800 of wireless communication. The method may be performed by a wireless device (e.g., the UE 104, the wireless device 404, the first wireless device 504, the wireless device 600, the apparatus 902/902'). According to various aspects, one or more of the illustrated operations may be omitted, transposed, and/or contemporaneous. In an aspect, additional operations may be implemented.

The method 800 illustrates one or more operations that may be performed in connection with operation 706 of FIG. 7, which includes reservation of the device for a duration of an upcoming event when the device is shared by one or more other users. One or more of the illustrated operations may occur in a same aspect, or fewer than all of the illustrated operations may occur in a same aspect.

In an aspect, reservation of the device for the duration of the upcoming event may include operation 802. At operation 802, the wireless device may provide a notification that one of the other users among which the device is shared is utilizing the device and/or transmit a second notification that indicates the reservation of the device for the duration of the upcoming event. For example, the wireless device may generate a notification that the device is in use by another user and the wireless device may present the generated notification at the wireless device, such as by displaying the notification on a display of the wireless device. In another example, the wireless device may generate a message that includes the second notification indicating the reservation of the device, and the wireless device may transmit the generated second notification, for example, to the device, to another wireless device that shares the device, and/or a server or cloud-based system configured to manage reservations of the device.

In the context of FIG. 4, the wireless device 404 may provide the indication 406, for example, to indicate that the first wireless headset 414 is disconnected from the wireless device 404 and the first wireless headset 414 is being utilized by another user. Additionally or alternatively, the wireless device 404 may transmit a notification (e.g., to another wireless device) that indicates the reservation of the first wireless headset 414 by the wireless device 404.

In the context of FIG. 5, the device manager 512 may provide a notification (e.g., on the display 506 of the first wireless device 504) that indicates the event device 550 is being utilized by a user of the second wireless device 540. Additionally or alternatively, the device manager 512 may transmit a notification 580 to the second wireless device 540 that indicates the reservation of the event device 550 by the first wireless device 504.

In the context of FIG. 6, the wireless device 600 may provide the indication 606, for example, to indicate that the wireless earbuds device 610 is disconnected from the wireless device 600 and the wireless earbuds device 610 is being utilized by another user. Additionally or alternatively, the wireless device 600 may transmit a notification (e.g., to another wireless device) that indicates the reservation of the wireless earbuds device 610 by the wireless device 600.

In one aspect, reservation of the device for the duration of the upcoming event may include operation 804. At operation 804, the wireless device may determine whether a user of the device is authenticated. For example, the wireless device may receive characteristic data, for example, from the device, from another wireless device, and/or a server or cloud-based system. The characteristic data may include biometric data detected by the device, data indicating how the device is moving (e.g., IMU output data), data indicating pressure applied to the device (e.g., data indicating how the device is being held or grasped by a user and/or data indicating pressure applied to tactile input), data indicating input characteristics (e.g., data indicating frequent inputs or input methods), data identifying the current user of the device (e.g., input used to login to the device), and/or other characteristic data. The wireless device may apply one or more algorithms to the characteristic data in order to identify the current user of the device and to determine whether the current user is authenticated for use of the device (e.g., whether the identified user is included in a stored list of allowed users). If the wireless device determines that the current user of the device is unauthenticated, the wireless device may proceed to operation 802, as described supra. If the wireless device determines that the current user of the device is authenticated, the wireless device may refrain from providing and/or transmitting notifications associated with reservation of the device.

In the context of FIG. 4, the wireless device 404 may determine whether the user 402 is authenticated for use of the first headset 414, the second headset 416, and/or the smart watch 412 (based on which of the first headset 414, the second headset 416, and/or the smart watch 412 is reserved). If the user 402 is determined to be unauthenticated, the wireless device 404 may provide or transmit a notification (e.g., the indication 406) indicating that the user 402 is determined to be unauthenticated. If the user 402 is determined to be authenticated, the wireless device 404 may refrain from providing or transmitting notifications.

In the context FIG. 5, the device manager 512 may determine whether a current user of the event device 550 is authenticated. If the current user is determined to be unauthenticated, the device manager 512 may provide or transmit a notification (e.g., the notification 580) indicating that the current user of the event device 550 is determined to be unauthenticated. If the current user of the event device 550 is determined to be authenticated, the device manager 512 may refrain from providing or transmitting notifications In the context of FIG. 6, the wireless device 600 may determine whether a current is authenticated for use of the wireless earbuds device 610. If the current user of the wireless earbuds device 610 is determined to be unauthenticated, the wireless device 600 may provide or transmit a notification (e.g., the indication 606) indicating that the current user is determined to be unauthenticated. If the current user is determined to be authenticated, the wireless device 600 may refrain from providing or transmitting notifications.

In one aspect, reservation of the device for the duration of the upcoming event may include operation 806 and operation 808. At operation 806, the wireless device may autonomously reserve the device based on historical data associated with connection of the device. For example, the wireless device may collect historical data associated with connection of the device to the wireless device. In an aspect, the wireless device may store data reflecting that the device is frequently connected to the wireless device during a one or more occurrences of a certain event. When the number of connections between the wireless device and a device in association with a certain event meets or exceeds a threshold, the wireless device may determine that the device is to be reserved for a next (e.g., future) occurrence of the certain event. Accordingly, when a next occurrence of the certain event is scheduled, the wireless device may autonomously identify the device as associated with that next occurrence of the certain event and reserve the device in association with the next occurrence of the certain event.

In the context of FIG. 4, the wireless device 404 may autonomously reserve, for example, the first headset 414 based on historical data associated with connection of the first headset 414 (or the device type 418) to the wireless device 404.

In the context of FIG. 5, the device manager 512 may autonomously reserve the event device 550 based on historical data associated with connection of the event device to the first wireless device 504.

In the context of FIG. 6, the wireless device 600 may autonomously reserve the wireless earbuds device 610 based on historical data associated with connection of the wireless earbuds device 610 to the wireless device 600.

At operation 808, the wireless device may determine that another reservation associated with the device conflicts with the autonomous reservation of the device. For example, the wireless device may receive information indicating the another reservation of the device, for example, from the device, from another wireless device, and/or from a server or cloud-based system. The wireless device may determine that the other reservation conflicts with the autonomous reservation when the other reservation indicates a time period during which the device is to be in use by another user that at least partially overlaps with a time period associated with autonomous reservation. If the wireless device determines that the other reservation associated with the device conflicts with the autonomous reservation, the wireless device may proceed to operation 802, as described supra. If the wireless device determines that the another reservation associated with the device does not conflict with the autonomous reservation, the wireless device may refrain from providing and/or transmitting notifications associated with reservation of the device.

In the context of FIG. 4, the wireless device 404 may determine that another reservation associated with, for example, the first wireless headset 414 conflicts with the autonomous reservation of the first wireless headset 414. If the wireless device 404 determines that the other reservation conflicts with the autonomous reservation of the first wireless headset 414, the wireless device 404 may provide or transmit a notification indicating the conflicting reservation.

In the context of FIG. 5, the first wireless device 504 may determine that another reservation associated with the event device 550 conflicts with the autonomous reservation of the event device 550. If the device manager 512 determines that the other reservation conflicts with the autonomous reservation of the event device 550, the device manager 512 may provide or transmit a notification indicating the conflicting reservation (e.g., the notification 580).

In the context of FIG. 6, the wireless device 600 may determine that another reservation associated with the wireless earbuds device 610 conflicts with the autonomous reservation of the wireless earbuds device 610. If the wireless device 600 determines that the other reservation conflicts with the autonomous reservation of the wireless earbuds device 610, the wireless device 600 may provide or transmit a notification indicating the conflicting reservation.

Figure 9:
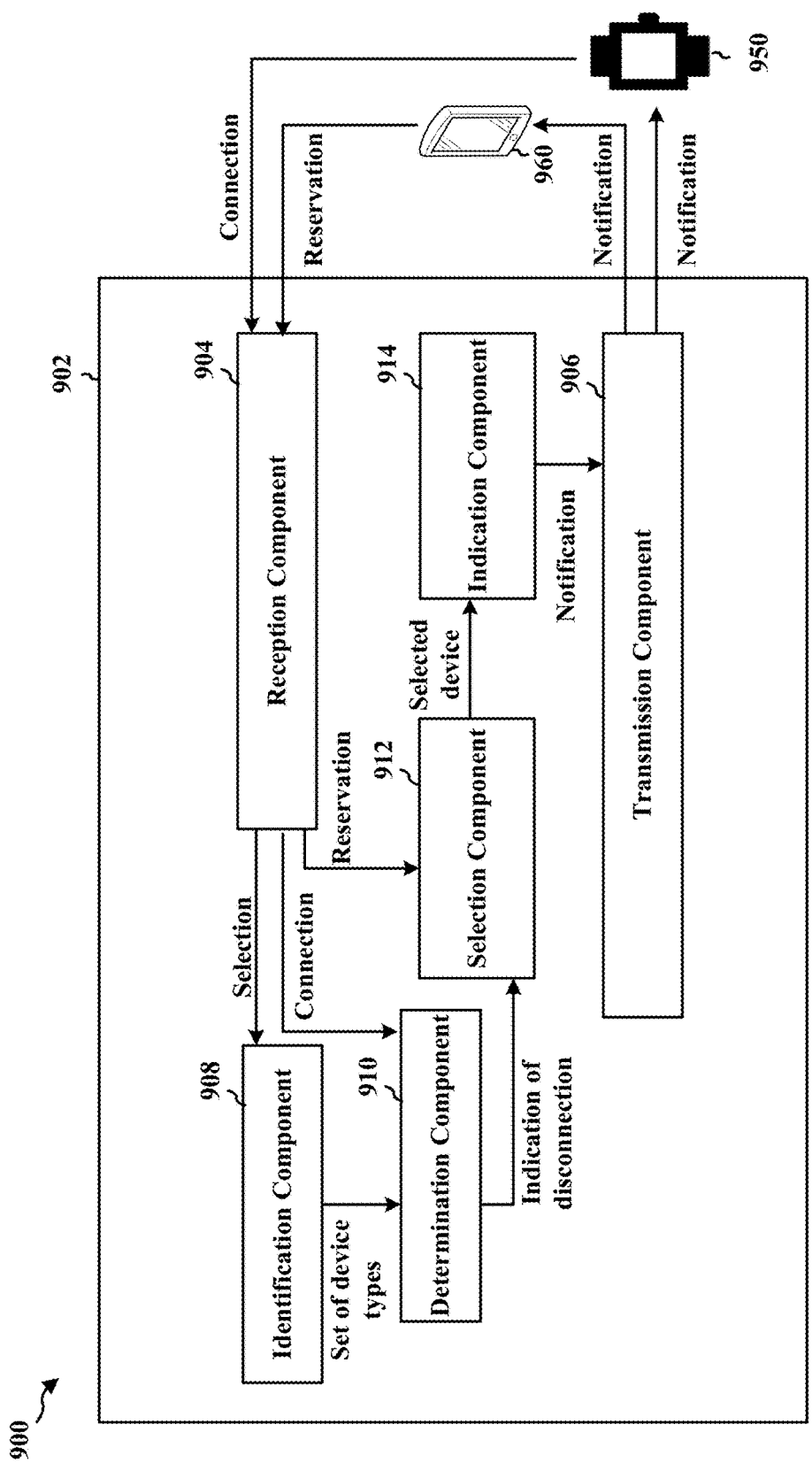
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus 902 may be a wireless device (e.g., the UE 104, the UE 350, the wireless device 404, the first wireless device 504, the wireless device 600). The apparatus 902 may include additional/other components and/or may include additional/other data flow.

The apparatus 902 may include a reception component 904 configured to receive signals, for example, from a second wireless device 960 and/or from an event device 950.

The apparatus 902 may include a transmission component 906 configured to transmit signals, for example, to the second wireless device 960 and/or to the event device 950.

The apparatus 902 may include an identification component 908. The identification component 908 may be configured to identify a set of device types associated with an upcoming event. In an aspect, the identification component 908 may be configured to select an upcoming event based on a current time and a first event, within a schedule, that is scheduled to occur after the current time. The identification component 908 may be configured to determine the set of device types associated with the upcoming event based on a device list associated with the upcoming event. In an aspect, the upcoming event may include a time period during which the at least one device type has been connected to the wireless device.

In an aspect, the identification component 908 may be configured to receive a user selection of the set of device types. The identification component 908 may be configured to associate the set of device types with the upcoming event.

The identification component 908 may be configured to provide an indication of the set of device types to a determination component 910. The determination component 910 may be configured to determine that at least one device type of the set of device types is disconnected from the apparatus 902. When the determination component 910 determines that at least one device type of the set of device types is disconnected from the apparatus 902, the determination component 910 may provide an indication of the disconnected at least one device type to a selection component 912.

The selection component 912 may be configured to select a device (e.g., the event device 950) from a set of devices associated with the at least one device type based on a subset of a set of parameters. The set of parameters may include a battery level or condition (e.g., available power) of a device (e.g., the event device 950), a data balance associated with a device, a voice balance associated with a device, an expected network coverage associated with a device at a location of the upcoming event, an expected call quality associated with a device at a location of the upcoming event, an expected data rate associated with a device at a location of the upcoming event, protocol compatibility between the wireless device and a device, types of ports and/or availability of ports of the wireless device (e.g., whether the apparatus 902 includes an available port suitable for a connection to a device), OS or other application compatibility (e.g., whether the apparatus 902 includes an OS or other application that is compatible with an OS of a device), whether the device is in use or reserved, or another parameter. The selection component 912 may select a subset of the set of parameters for the device (e.g., the event device 950) upon which selection of a device may be conditioned. The selection component 912 may then select the device (e.g., the event device 950) based on the selected subset of parameters, such as by comparing the selected subset of parameters for the device (e.g., the event device 950) to another subset of parameters for another device.

The selection component 912 may provide an indication of the selected device to an indication component 914. The indication component 914 may be configured to provide an indication of the selected device (e.g., the event device 950) associated with the at least one device type. In an aspect, the indication may indicate that the at least one selected device is disconnected from the apparatus 902. In an aspect, the indication component 914 may provide the indication as a visual indication (e.g., an indication presented on a display of the apparatus 902), an audio indication (e.g., an indication played through speakers of the apparatus 902), and/or a tactile indication (e.g., a vibration caused by vibration motor of the apparatus 902). In one aspect, the indication may further indicate that another user has reserved the device (e.g., the event device 950) during a time period that overlaps with the upcoming event. In one aspect, the indication may further indicate at least one additional device associated with the at least one device type determined to be disconnected from the apparatus 902 and/or information identifying the other user who reserved the device (e.g., the event device 950).

In an aspect, the selection component 912 may be configured to reserve the event device 950 for a duration of the upcoming event when the device is shared by one or more other users. The selection component 912 may provide an indication of the reservation of the event device 950 to the indication component 914. The indication component 914 may be configured to provide a first notification that one of the other users is utilizing the event device 950, such as by presenting a notification on a display of the apparatus 902. Alternatively or additionally, the indication component 914 may be configured to transmit a second notification that indicates the reservation of the event device 950 for the duration of the upcoming event. For example, the indication component 914 may transmit the second notification to at least one of the second wireless device 960 and/or the event device 950.

In an aspect, the selection component 912 may be configured to determine whether a user of the event device 950 is authenticated. For example, the selection component 912 may be configured to receive characteristic data associated with a current user of the event device 950, and the selection component 912 may be configured to compare the characteristic data to stored data associated with permitted users in order to determine if the current user is authenticated. If the selection component 912 determines that the current user of the event device 950 is unauthenticated, then the selection component 912 may indicate, to the indication component 914, that the current user of the event device 950 is authenticated. The indication component 914 may be configured to provide a first notification that an unauthenticated user is utilizing the event device 950, such as by presenting a notification on a display of the apparatus 902. Alternatively or additionally, the indication component 914 may be configured to transmit a second notification that indicates an unauthenticated user is utilizing the event device 950. For example, the indication component 914 may transmit the second notification to at least one of the second wireless device 960 and/or the event device 950.

In an aspect, the selection component 912 may be configured to autonomously reserve the event device 950 based on historical data associated with connection of the device to the apparatus 902. For example, the selection component 912 may determine that the event device 950 has been connected to the apparatus 902 during a number of occurrences of a past event corresponding to the upcoming event. When the number of occurrences meets or exceeds a threshold, the apparatus 902 may associate with the event device 950 (or a device type associated with the event device 950) with the upcoming event and autonomously reserve the event device 950 for the duration of the upcoming event.

In an aspect, the selection component 912 may determine that another reservation associated with the event device 950 conflicts with the autonomous reservation. For example, the selection component 912 may receive an indication of the conflicting reservation from the event device 950, the second wireless device 960, and/or a server or cloud-based system. The selection component 912 may determine that the conflicting reservation conflicts with the autonomous reservation when a time period of the conflicting reservation at least partially overlaps with a time period of the autonomous reservation.

The selection component 912 may provide an indication of the conflicting reservation associated with the event device 950 to the indication component 914. The indication component 914 may be configured to provide a first notification that a conflicting reservation is scheduled for the event device 950, such as by presenting a notification on a display of the apparatus 902. Alternatively or additionally, the indication component 914 may be configured to transmit a second notification that indicates the conflicting reservation for the event device 950. For example, the indication component 914 may transmit the second notification to at least one of the second wireless device 960 and/or the event device 950.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
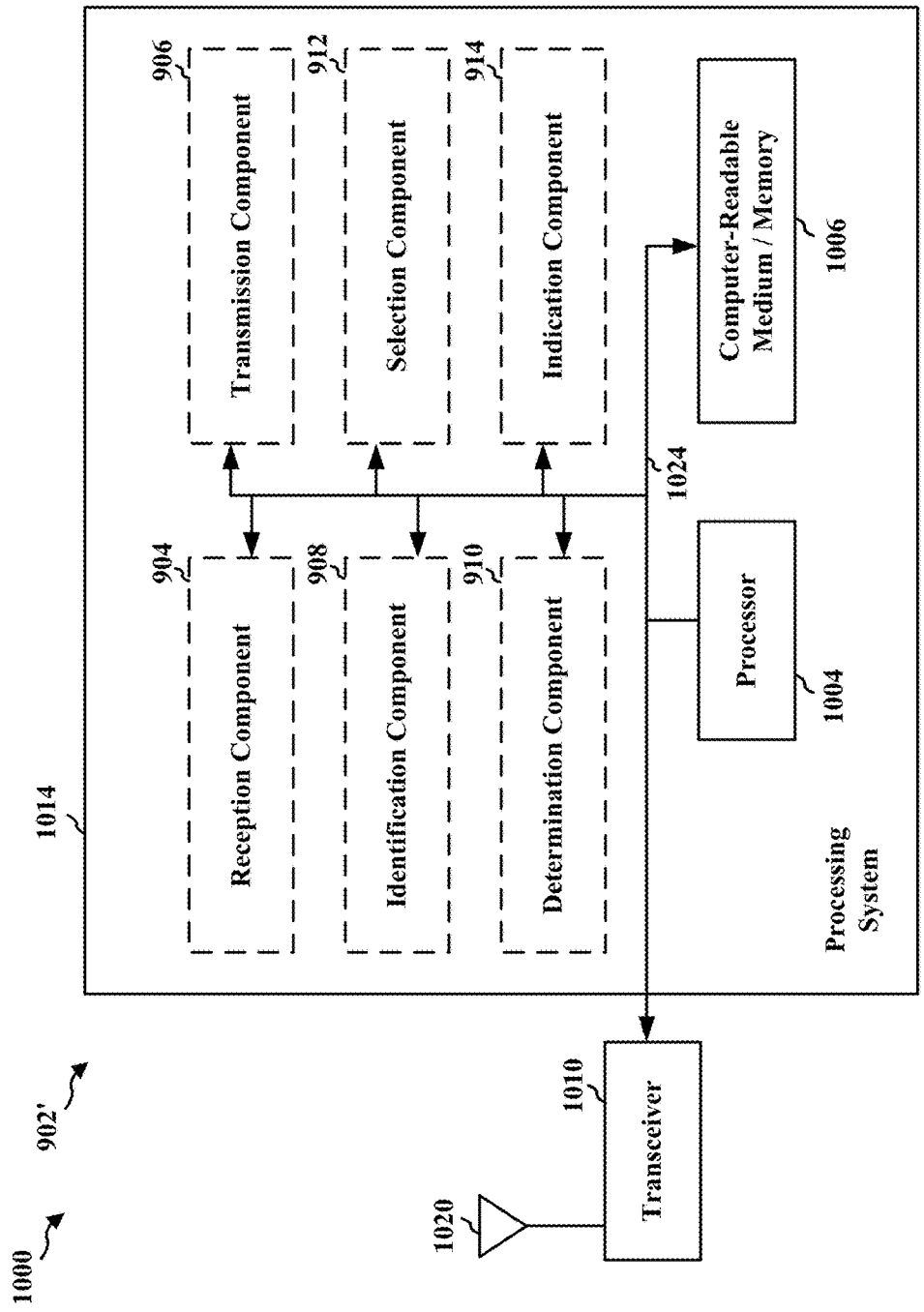
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for identifying a set of device types associated with an upcoming event. The apparatus 902/902' may further include means for determining that at least one device type of the set of device types is disconnected from the wireless device. The apparatus 902/902' may further include means for selecting a device from a set of devices associated with the at least one device type based on a subset of a set of parameters. The apparatus 902/902' may further include means for providing an indication of the selected device associated with the at least one device type, wherein the indication indicates that the at least one selected device is disconnected from the wireless device.

In an aspect, the means for identifying the set of device types is configured to select the upcoming event based on a current time and a first event, within a schedule, that is scheduled to occur after the current time, and determine the set of device types associated with the upcoming event based on a device list associated with the upcoming event.

In an aspect, the upcoming event includes a time period during which the at least one device type has been connected to the apparatus 902/902'.

In an aspect, the apparatus 902/902' may further include means for receiving a user selection of the set of device types. The apparatus 902/902' may further include means for associating the set of device types with the upcoming event.

In an aspect, the set of parameters may include a battery condition for each device of the set of devices, a data balance for each device of the set of devices, a voice balance for each device of the set of devices, an expected network coverage for each device of the set of devices at a location associated with the upcoming event, an expected call quality for each device of the set of devices at the location associated with the upcoming event, or an expected data rate for each device of the set of devices, wherein the subset is determined based on the upcoming event.

In an aspect, the indication further indicates that another user has reserved the device during a time period that overlaps with the upcoming event. In an aspect, the indication further comprises at least one of an additional device associated with the at least one device type or information identifying the other user.

In an aspect, the apparatus 902/902' may further include means for reserving the device for a duration of the upcoming event when the device is shared by one or more other users. In an aspect, the means for reserving the device is configured to at least one of provide a first notification that one of the other users is utilizing the device or transmit a second notification that indicates the reservation of the device for the duration of the upcoming event.

In an aspect, the apparatus 902/902' may further include means for determining whether a user of the device is authenticated, and the provision of the first notification or the transmission of the second notification is based on the authentication of the user of the device. In an aspect, the determination that the user of the device is authenticated is based on characteristic data detected for the user of the device. In an aspect, the means for reserving the device is configured to autonomously reserve the device based on historical data associated with connection of the device.

In an aspect, the apparatus 902/902' may further include means for determining that another reservation associated with the device conflicts with the autonomous reservation, and at least one of the provision of the first notification or the transmission of the second notification is based on the determination that the other reservation associated with the device conflicts with autonomous reservation.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a wireless device, comprising:
   identifying a set of device types associated with a user's upcoming event and associated with a set of devices that have been previously connected with the wireless device;
   determining, from among the set of device types, at least one device type of the set of device types that is currently disconnected from the wireless device;
   selecting, from the set of devices that have been previously connected with the wireless device, a device associated with the at least one device type based on a subset of a set of parameters; and
   providing, to the user of the wireless device, an indication of the selected device associated with the at least one device type, wherein the indication indicates that the selected device is currently disconnected from the wireless device.

2. The method of claim 1, wherein the identifying the set of device types comprises:
   selecting the upcoming event based on a current time and a first event, within a schedule, that is scheduled to occur after the current time; and
   determining the set of device types associated with the upcoming event based on a device list associated with the upcoming event.

3. The method of claim 1, wherein the upcoming event comprises a time period during which the at least one device type has been connected to the wireless device.

4. The method of claim 1, further comprising:
   receiving a user selection of the set of device types; and
   associating the set of device types with the upcoming event.

5. The method of claim 1, wherein the set of parameters comprises at least one of:
   a battery condition for each device of the set of devices,
   a data balance for each device of the set of devices,
   a voice balance for each device of the set of devices,
   an expected network coverage for each device of the set of devices at a location associated with the upcoming event,
   an expected call quality for each device of the set of devices at the location associated with the upcoming event, or
   an expected data rate for each device of the set of devices, wherein the subset is determined based on the upcoming event.

6. The method of claim 1, wherein the indication further indicates that another user has reserved the device during a time period that overlaps with the upcoming event.

7. The method of claim 6, wherein the indication further comprises at least one of an additional device associated with the at least one device type or information identifying the another user.

8. The method of claim 1, further comprising:
   reserving the device for a duration of the upcoming event when the device is shared by one or more other users.

9. The method of claim 8, wherein the reserving the device further comprises at least one of:
   providing a first notification that one of the one or more other users is utilizing the device; or
   transmitting a second notification that indicates the reservation of the device for the duration of the upcoming event.

10. The method of claim 9, further comprising:
    determining whether the one of the one or more other users of the device is authenticated, wherein the provision of the first notification or the transmission of the second notification is based on the determining that the one of the one or more other users of the device is authenticated.

11. The method of claim 10, wherein the determination of whether the one of the one or more other users of the device is authenticated is based on characteristic data detected for the one of the one or more other users of the device.

12. The method of claim 9, wherein the reservation of the device comprises:
    autonomously reserving the device based on historical data associated with the previous connection of the device.

13. The method of claim 12, further comprising:
    determining that another reservation associated with the device conflicts with the autonomous reservation,
    wherein at least one of the provision of the first notification or the transmission of the second notification is based on the determining that the another reservation associated with the device conflicts with the autonomous reservation.

14. A wireless device for wireless communication, the wireless device comprising:
    means for identifying a set of device types associated with a user's upcoming event and associated with a set of devices that have been previously connected with the wireless device;
    means for determining, from among the set of device types, at least one device type of the set of device types that is currently disconnected from the wireless device;
    means for selecting, from the set of devices that have been previously connected with the wireless device, a device associated with the at least one device type based on a subset of a set of parameters; and
    means for providing, to the user of the wireless device, an indication of the selected device associated with the at least one device type, wherein the indication indicates that the selected device is currently disconnected from the wireless device.

15. The wireless device of claim 14, wherein the means for identifying the set of device types is configured to:
    select the upcoming event based on a current time and a first event, within a schedule, that is scheduled to occur after the current time; and
    determine the set of device types associated with the upcoming event based on a device list associated with the upcoming event.

16. The wireless device of claim 14, wherein the upcoming event comprises a time period during which the at least one device type has been connected to the wireless device.

17. The wireless device of claim 14, further comprising:
means for receiving a user selection of the set of device types; and
means for associating the set of device types with the upcoming event.

18. The wireless device of claim 14, wherein the set of parameters comprises at least one of:
a battery condition for each device of the set of devices,
a data balance for each device of the set of devices,
a voice balance for each device of the set of devices,
an expected network coverage for each device of the set of devices at a location associated with the upcoming event,
an expected call quality for each device of the set of devices at the location associated with the upcoming event, or
an expected data rate for each device of the set of devices, wherein the subset is determined based on the upcoming event.

19. The wireless device of claim 14, wherein the indication further indicates that another user has reserved the device during a time period that overlaps with the upcoming event.

20. The wireless device of claim 19, wherein the indication further comprises at least one of an additional device associated with the at least one device type or information identifying the other user.

21. The wireless device of claim 14, further comprising:
means for reserving the device for a duration of the upcoming event when the device is shared by one or more other users.

22. The wireless device of claim 21, wherein the means for reserving the device is configured to at least one of:
provide a first notification that one of the one or more other users is utilizing the device; or
transmit a second notification that indicates the reservation of the device for the duration of the upcoming event.

23. The wireless device of claim 22, further comprising:
means for determining whether the one of the one or more other users of the device is authenticated, wherein the provision of the first notification or the transmission of the second notification is based on the authentication of the one of the one or more other users of the device.

24. The wireless device of claim 23, wherein the determination that the one of the one or more other users of the device is authenticated is based on characteristic data detected for the one of the one or more other users of the device.

25. The wireless device of claim 24, wherein the means for reserving the device is configured to:
autonomously reserve the device based on historical data associated with the previous connection of the device.

26. The wireless device of claim 25, further comprising:
means for determining that another reservation associated with the device conflicts with the autonomous reservation,
wherein at least one of the provision of the first notification or the transmission of the second notification is based on the determination that the other reservation associated with the device conflicts with autonomous reservation.

27. A wireless device for wireless communication, the wireless device comprising:
a memory; and
at least one processor coupled to the memory and configured to:
identify a set of device types associated with a user's upcoming event and associated with a set of devices that have been previously connected with the wireless device;
determine, from among the set of device types, at least one device type of the set of device types that is currently disconnected from the wireless device;
select, from the set of devices that have been previously connected with the wireless device, a device associated with the at least one device type based on a subset of a set of parameters; and
provide, to the user of the wireless device, an indication of the selected device associated with the at least one device type, wherein the indication indicates that the selected device is currently disconnected from the wireless device.

28. The wireless device of claim 27, wherein the identification of the set of device types comprises to:
select the upcoming event based on a current time and a first event, within a schedule, that is scheduled to occur after the current time; and
determine the set of device types associated with the upcoming event based on a device list associated with the upcoming event.

29. The wireless device of claim 27, wherein the set of parameters comprises at least one of:
a battery condition for each device of the set of devices,
a data balance for each device of the set of devices,
a voice balance for each device of the set of devices,
an expected network coverage for each device of the set of devices at a location associated with the upcoming event,
an expected call quality for each device of the set of devices at the location associated with the upcoming event, or
an expected data rate for each device of the set of devices, wherein the subset is determined based on the upcoming event.

30. A non-transitory, computer-readable medium storing computer-executable code for wireless communication by a wireless device, comprising code to:
identify a set of device types associated with a user's upcoming event and associated with a set of devices that have been previously connected with the wireless device;
determine, from among the set of device types, at least one device type of the set of device types that is currently disconnected from the wireless device;
select, from the set of devices that have been previously connected with the wireless device, a device associated with the at least one device type based on a subset of a set of parameters; and
provide, to the user of the wireless device, an indication of the selected device associated with the at least one device type, wherein the indication indicates that the selected device is currently disconnected from the wireless device.

* * * * *